United States Patent [19]

Koreeda et al.

[11] Patent Number: 5,781,731
[45] Date of Patent: Jul. 14, 1998

[54] SCHEDULE MANAGEMENT SUPPORT SYSTEM

[75] Inventors: Hiroyuki Koreeda; Yasuhiko Kasai, both of Fujisawa; Tsukasa Yamauchi, Yokohama; Hajime Asuma, Chigasaki; Shigeto Oeda, Fujisawa; Jun Ito, Yokohama; Hiromi Tomita; Tsukasa Hasegawa, both of Hiratsuka; Rituko Kanazawa, Kamakura; Yoshiisa Inoue, Ebina; Hiroyuki Kumai; Shigeki Hataya, both of Yokohama; Akira Nakajima; Yasumasa Matsuda, both of Tokyo, all of Japan

[73] Assignee: Hitachi, Ltd., Tokyo, Japan

[21] Appl. No.: 717,251

[22] Filed: Sep. 20, 1996

[30] Foreign Application Priority Data

Sep. 21, 1995 [JP] Japan .................................. 7-2422940
Oct. 2, 1995 [JP] Japan .................................. 7-255173

[51] Int. Cl.⁶ .................................................. G06F 17/00
[52] U.S. Cl. ................................................... 395/200.34
[58] Field of Search .......................... 395/200.32, 200.34, 395/200.5, 200.51; 345/330, 331, 332

[56] References Cited

U.S. PATENT DOCUMENTS

| 5,491,797 | 2/1996 | Thompson et al. | 395/200.34 |
| 5,537,548 | 7/1996 | Fin et al. | 395/200.32 |
| 5,548,722 | 8/1996 | Jalalian et al. | 395/200.51 |

OTHER PUBLICATIONS

Ng et al., "Design and Implementation of Conference Scheduling and Voting Facilities for a Multi-media Conferencing System"; Computer Software and Applications Conference, 1994.

Primary Examiner—Ellis B. Ramirez
Attorney, Agent, or Firm—Antonelli, Terry, Stout & Kraus, LLP

[57] ABSTRACT

When conference conditions are set by a conference sponsor, a conference sponsor agent inquires of schedule management agents of requested attendants about available time within a range of set dates, determines an optimum conference schedule on the basis of the available time of the individual requested attendants, sends to the conference sponsor the conference schedule for confirmation thereof, and sends a conference notification to the requested attendants. In order to permit an input value set by a user to have a range in accordance with the kind of parameter requiring the input value and conditions at that time, an input value acquiring element acquires an input value of a parameter necessary for a processing realized by an application element, the input value being set by the user by an input element. An allowable value determining element determines an allowable value to be added to the input value on the basis of information supplied from the application element and corresponding to the kind of the parameter and conditions at that time, and an allowable value adding element determines a different input value from the acquired input value by adding the allowable value to the acquired input value and delivers the acquired input value and the thus determined different input value, as input values of the parameter, to the application element.

29 Claims, 25 Drawing Sheets

FIG. 6

SCHEDULE MANAGEMENT SUPPORT SYSTEM

BACKGROUND OF THE INVENTION

The present invention relates to a conference schedule management support system in a computer system having a plurality of computer terminals coupled to each other through communication means, and more particularly to a conference giving and schedule management support system which performs conference schedule planning, notification of the conference scheduling and the procedures of confirming attendance or absence in lieu of a conference sponsor.

A conference support system disclosed in "Report of Search for and Study on ME Intellectual Software Environment" issued by Japan Electronic Industry Development Association, pp. 90–123 is a known conventional system utilizing an agent technique in which a computer performs the procedures in lieu of individual persons.

Referring to a work flow chart of FIG. 1, in this type of conference giving support system, a conference sponsor agent 100 representative of a conference sponsor (person A) first plans a schedule 110 for a conference by consulting a schedule 130 of the person A and occupied/unoccupied status 120 of a conference room and causes the conference sponsor to temporarily settle the plan. Next, an attendance request based on the conference schedule plan 110 is sent (150) to agents 200 representative of all persons concerned (members). An agent 200 representative of a member (person Z) receiving an attendance request notification decides (210) whether the person Z can attend the conference based on the conference giving schedule plan 110 by consulting a schedule 220 of the person Z and answers (240) by confirming attendance or absence at the conference to the conference sponsor agent 100.

When determining (140), by consulting attendance or absence answer results, that the conference will be able to be held, the conference sponsor agent 100 sends (160) to each agent 200 a conference notification which in turn is registered (230) in a schedule of each person.

By causing the agents realized with software to execute the work flow as described above, the conference sponsor can take advantage of automated conference schedule planning and execution of troublesome procedures of sending attendance requests and attendance or absence confirmation to members, and the efficiency of a troublesome schedule adjustment job by the conference sponsor can be improved.

Available as a technique which is indispensable for realizing the agent as above is a knowledge processing technique. For example, a knowledge processing system called an expert system has already been realized in which, as shown in FIG. 2, a knowledge data base 340 necessary for decision is prepared in advance, a knowledge matching the knowledge data base 340 is retrieved (350) by a knowledge processing unit 330 on the basis of information obtained in a user interface unit 300 comprised of a display unit, such as a CRT 310, and an input unit, such as a keyboard 320, by interacting with a user 360, and a matched knowledge is answered to the user.

For example, a medical diagnostic expert system receives information concerning a symptom such as "having a fever", "sniveling" or "having a sore throat" by interacting with the user and based on the information, extracts information on a treatment of a diagnostic result and illness of, for example, "having a cold" from the knowledge data base to answer the extracted information to the user.

In the agent system, an agent program interacts with a knowledge processing system in place of direct interaction with the knowledge processing system by a person and carries out a decision making processing on the basis of obtained knowledge. Knowledge information of the knowledge data base is updated on the basis of a response of the user to the agent.

In the conference giving support system as described above, the conference sponsor first settles on a tentative conference schedule to then inquire of members about attendance to or absence from the conference, and if the schedule is not confirmed by a member or members, the conference sponsor must proceed with an adjusting job in which the conference schedule is changed and a similar inquiry processing is repeated until a schedule is finally confirmed.

Since in this type of system the conference schedule must be settled tentatively since the schedules of other persons (individual members) are unknown, there is a possibility that a failure to confirm a meeting schedule is repeated many times especially when the schedules of individual members are very congested. In such an event, the number of operations to change the conference schedule and again make a request for attendance increases, failing to significantly decrease the workload of the conference sponsor. In addition, the conference schedule remains suspended for a long time, giving rise to a possibility that business is hindered.

In the system, the knowledge data base the agent consults may conceivably be held at one site in a top-down fashion but for a personal agent who performs conference scheduling or personal schedule management, each user has a knowledge data base specific thereto to permit each agent to store knowledge obtained from a reaction by a user in a knowledge data base specific to that user, thus making it possible to perform a processing which takes characteristics of a job effected by each person into consideration.

Next, in an information processing apparatus, when a user sets an input value of a parameter which is necessary for execution of a processing, the input value is rejected if the input value set by the user is an improper input value and the user is urged to reset an input value.

In some applications, the input value of the parameter becomes proper or improper in accordance with conditions at that time.

For example, in an information processing apparatus in which an input value of a parameter is set when the user selects a desired input value from a plurality of input values prepared in advance, the processing to be executed may include various types of processings for realization of a word processor function and a plurality of input values are menu items indicative of various commands for designating the execution of these processings.

In such a case, when a document file remains unopened or when preparation of a new document file has not yet started, the save processing for saving a document file cannot be executed because a document file to be saved does not exist. Under this condition, when the user selects a menu item "save" representative of a command for designating execution of the save processing from a command selection menu, the selected menu item is rejected and the user is urged to again select a menu item.

Accordingly, in order to prevent an input value which is improper for specified conditions from being set, a technique for inhibiting the selection of an input value has hitherto been contrived.

More particularly, when a document file remains unopened or when preparation of a new document file has not yet started in the aforementioned example, the user is prevented from selecting the "save" menu item from the command selection menu.

The above described prior art ensures easier use by the user in that a menu item not to be selected, that is, a menu item which is improper under conditions at that time is clarified.

But application of the above described prior art is difficult to achieve when for example, the user selects the "print" menu item and thereafter sets input values of various parameters necessary for execution of the print processing.

More specifically, when various parameters necessary for execution of the print processing include two parameters of such as "print quality" and "print speed" which are correlated to each other such that an input value of one parameter changes with an input value of the other parameter, the input value of the other parameter conceivably becomes proper or improper in accordance with the input value of one parameter, thus making the application of the above prior arts difficult.

Even in the case of the two parameters in which the input value of one parameter changes with the input value of the other parameter, when the two input values are determined definitely, that is, the two input values correspond to each other in one to one relation, the input value of one parameter is set and then the input value of the other parameter can automatically be changed in accordance with the set input value. A technique to this effect has been contrived.

In the technique of automatically changing the input value of the other parameter in accordance with the input value of one parameter, however, setting/changing of the input value of the other parameter cannot be permitted when the input value of one parameter is settled. Practically, the parameter whose input value has previously been set by the user may sometimes have an input value other than the set input value or the parameter whose input value is about to be set secondly may sometimes be difficult to change to an input value other than a desired input value.

Further, not all types of parameters in which the input value of one parameter changes in accordance with the input value of the other parameter always have input values which correspond to each other in one to one relation.

Accordingly, in the prior art, when the user sets the input values of two parameters, the input values of the parameters are suitably changed and setting/changing of the input values is performed in a cut and try fashion. But such an operation method faces a problem that the number of operations by the user increases.

Another conventional technique can be applied wherein even in the case of two parameters in which an input value of one parameter changes with an input value of the other parameter but the two input values are not determined definitely, that is, the two input values correspond to each other in a one to plurality or plurality to plurality fashion, the input values of the parameters are suitably changed so as to be set and changed in a cut and try fashion. But upon setting/changing of the input values in a cut and try fashion, the correlations between the two parameters are difficult to discriminate, thus raising a problem that simple use by the user is degraded.

SUMMARY OF THE INVENTION

An object of the present invention is to permit a conference sponsor agent to determine a highly practical conference schedule in a self-controlled fashion and confirm attendance/absence to and from the conference automatically and to permit a conference sponsor to greatly decrease the amount of jobs executions before settling on the conference schedule.

Another object of the present invention is to realize a technique which can decrease the possibility that an input value set by a user is rejected by allowing an input value of a parameter necessary for execution of a processing to have a broad scope.

According to the present invention, in a conference schedule management support system in which a plurality of information processing apparatuses each having the function of interacting with a user are coupled to each other through communication means, a schedule management agent holds schedule information for each user and a conference sponsor agent performs schedule adjustment for requested attendants in accordance with desirable conditions for attending a conference designated by a user. The conference sponsor agent, when given desirable conference conditions by a user who requests a conference, inquires of the schedule management agents of all users who are requested to attend the conference about available times within a range of desirable conference giving dates, determines a conference schedule on the basis of the available information from all of the requested attendants, presents to the conference sponsor the conference schedule for confirmation thereof, and notifies a confirmed conference to the schedule management agents of the requested attendants.

Specifically, the conference giving and schedule management support system comprises means for holding schedule information for each user, means for setting schedule information, means for reading the schedule information, knowledge information holding means for holding user's conference and schedule management information, means for retrieving knowledge information from the knowledge information holding means, conference condition setting means for inputting scheduling conditions of a conference on the basis of a designation by a user, schedule inquiring means for inquiring of an information processing apparatus all of requested attendants set by the conference condition setting means about available time within a range of desirable conference giving dates and hours set by the conference condition setting means, schedule searching means responsive to the inquiry to read schedule information available within the corresponding range of time, schedule returning means for answering available time information, conference hour determining means for selecting an optimum time zone within which all members are able to attend from the available time information answered from the requested attendants and determining the selected optimum time zone, conference contents notifying means for notifying the determined conference contents to a user who has input the conference conditions, and conference notifying means for transmitting a conference schedule confirmation notice message to the information processing apparatus of the requested attendants on the basis of information of the conference contents determined by the conference hour determining means.

The conference sponsor agent inquires of all of the requested attendants about available time, selects a time zone within which all members are able to attend a conference, causes the conference sponsor to confirm the contents, sends a confirmed conference schedule notification to all of the requested attendants, and obtains replies regarding attendance or absence to monitor conclusion/ failure of the conference.

In the above circumstances, when two parameters, which are used for selection of a process to be executed in a self-monitored fashion, are correlated to each other but input values of the individual parameters are set at different times, so that one parameter whose input value is set precedently cannot be decided, at the time that the input value is set, it is determined whether the set input value is proper.

Considered as this type of example is setting of a conference giving date in scheduling software for managing schedules of individual persons.

For example, in order to set a conference date of a conference which persons A and B are requested to attend, a job is carried out in which a temporary conference date of "X day of X month" is usually set, the persons A and B are informed that the conference will be held on "X day of X month" through a network and the schedule is adjusted. If it is known in advance that at least one of the persons A and B has made an earlier appointment for "X day of X month", the input value can be determined to be improper as an input value of a parameter of conference date and the user can be inhibited from setting the input value. But at the time that the temporary conference giving date is set, schedules of the persons A and B are unknown and therefore, "X day of X month" is proper as the input value of the parameter of the conference date, thus allowing the user to set the input value.

When an input value of a parameter to be inhibited from being set by the user is not specifically known at the time that the input value is set, the previously-described prior art which automatically changes an input value of one parameter in accordance with an input value of the other parameter cannot cope with such a situation.

As countermeasures thereagainst, a technique has been contrived in which upon setting of a conference date, a plurality of input values such as first and second desirable values are set. Such a technique requiring setting of the plurality of input values raises a problem that the number of operations by the user is increased. Further, upon setting of a conference time, an input value of a parameter of the conference time represents a range (here, a time zone) and hence the number of operations by the user is further increased.

Even in such situations, the information processing apparatus of the present invention can acquire a plurality of input values inclusive of an input value set by the user as an input value of a parameter necessary for execution of a processing and so the easiness of use by the user can be improved.

To accomplish the above object, an information processing apparatus according to an aspect of the present invention comprises processing means for execution of processings, input value acquiring means for acquiring an input value of a parameter necessary for the processing means to execute a processing, an allowable value determining means for determining an allowable value to be added to the input value acquired by the input value acquiring means in accordance with information supplied from the processing means, and an allowable value adding means for determining a different input value inclusive of the acquired input value or another different input value exclusive of the acquired input value by adding the allowable value determined by the allowable value determining means to the input value acquired by the input value acquiring means.

To accomplish the above object, an information processing apparatus according to another aspect of the present invention comprises processing means for executing processings, input value acquiring means for acquiring an input value of a parameter necessary for the processing means to execute a processing, and allowable value adding means for determining a different input value inclusive of the acquired input value or another input value exclusive of the acquired input value by adding an allowable value to information concerning the parameter to the input value acquired by the input value acquiring means.

To accomplish the above object, an information processing apparatus according to another aspect of the present invention comprises processing means for executing processings, input value acquiring means for acquiring an input value of a parameter necessary for the processing means to execute a processing and an allowable value to be added to the input value, and allowable value adding means for determining a different input value from the acquired input value by adding the allowable value acquired by the input value acquiring means to the input value acquired by the input value acquiring means, wherein the processing means decides whether the input value acquired by the input value acquiring means and the input value determined by the allowable value adding means are input values suitable for executing the processing.

BRIEF DESCRIPTION OF THE DRAWINGS

FIG. 6 shows a conference condition setting screen.

DESCRIPTION OF THE PREFERRED EMBODIMENTS

The present invention will now be described by way of example with reference to the accompanying drawings.

Figure 1:
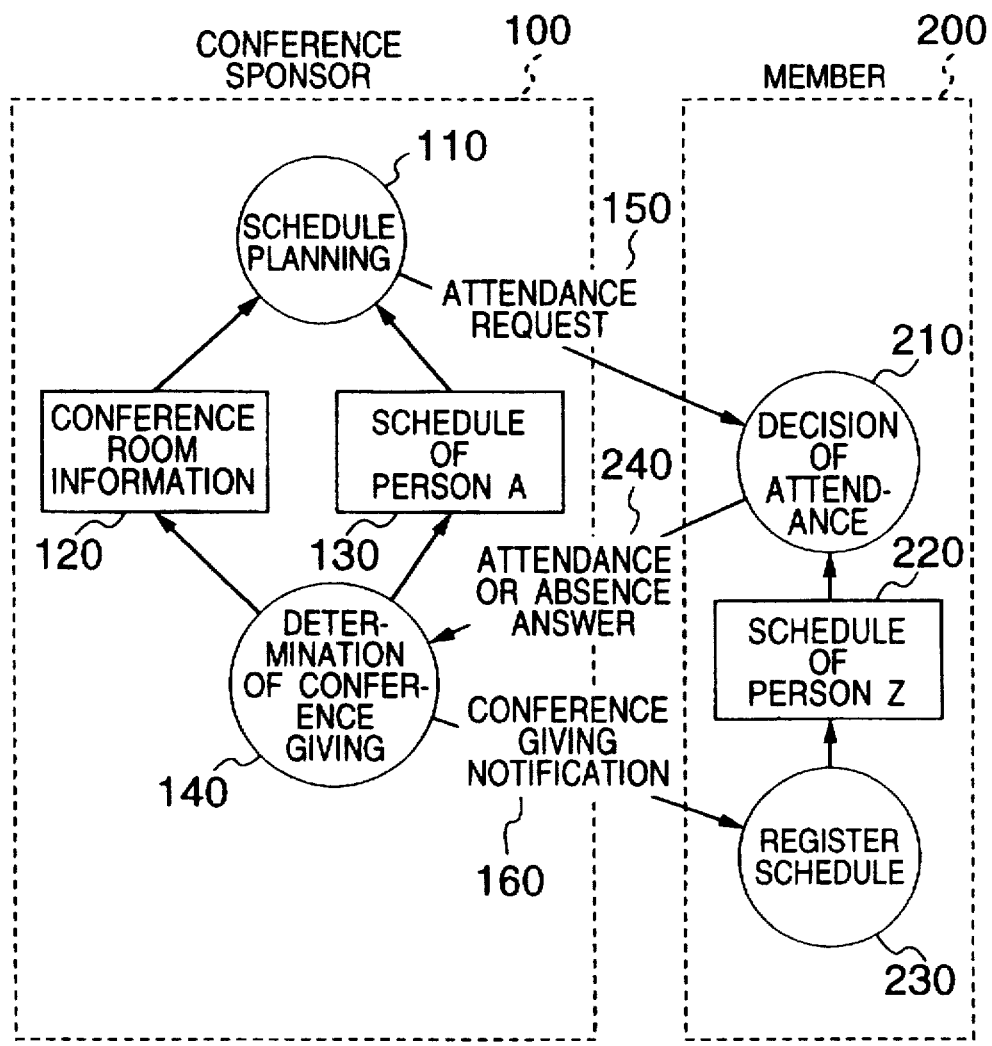
FIG. 1 is a general work flow chart of scheduling a conference.
Figure 2:
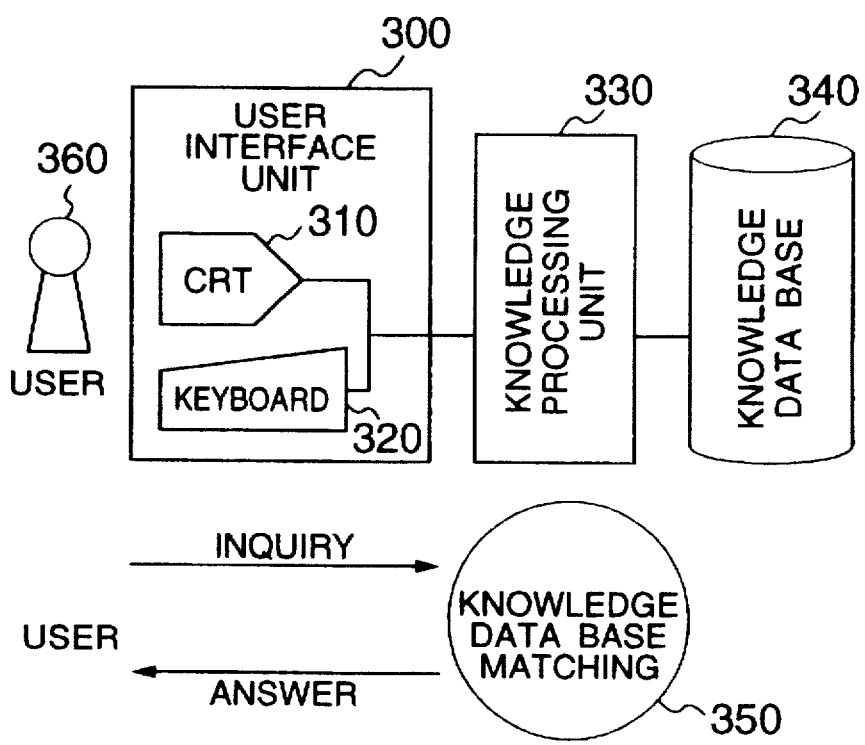
FIG. 2 is a block diagram of an information processing apparatus carrying an agent system.
Figure 3:
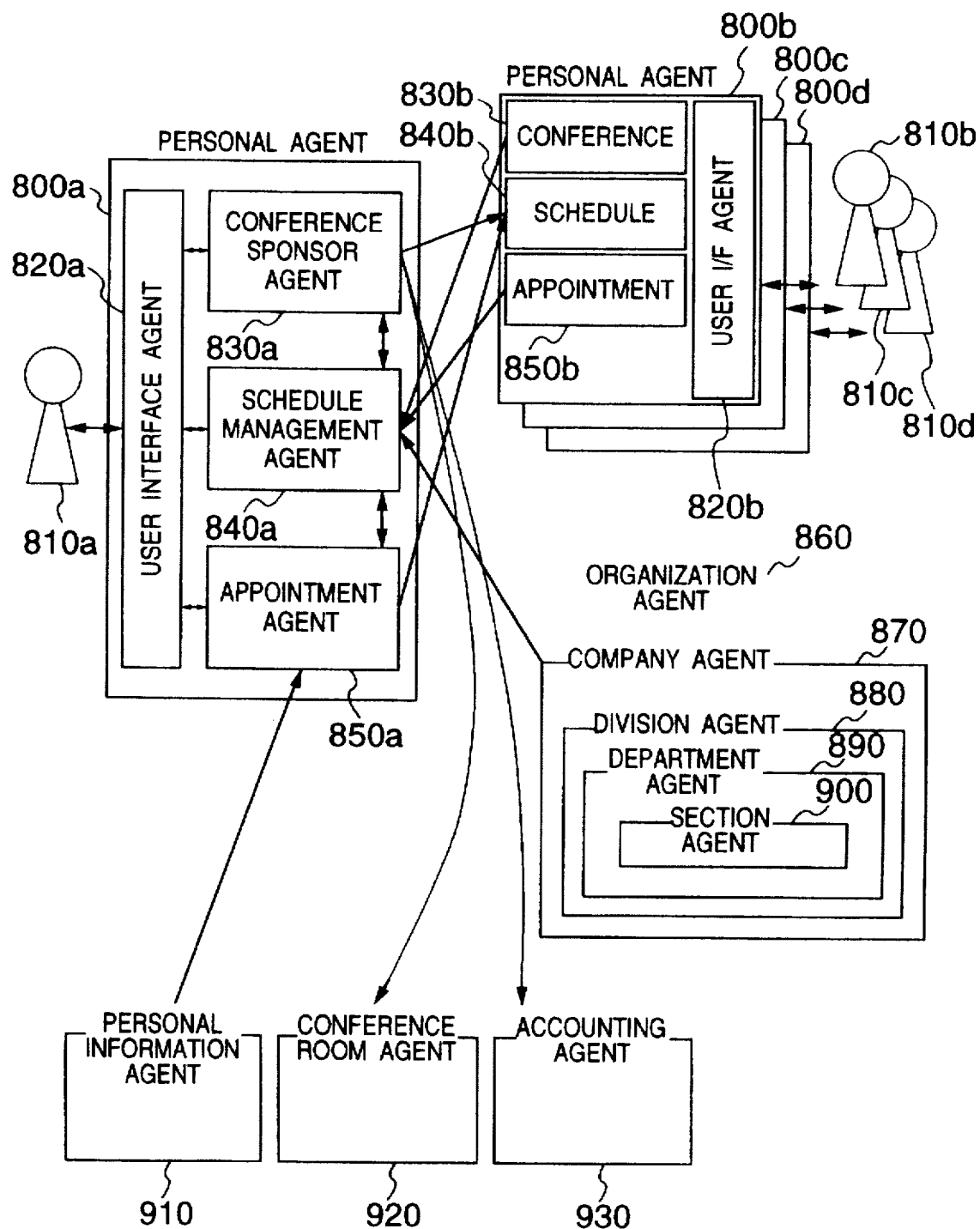
FIG. 3 is a block diagram of a conference schedule management support system according to the present invention.

Referring now to FIG. 3, there is illustrated, in block form, a system construction of an embodiment of a conference schedule management supporting system according to the present invention. This support system is so constructed as to be realized with an information processing program in a computer system. Respective programs of personal agents 800a, 800b . . . are executed by respective computer terminals representing information processing apparatuses owned by respective users 810a, 810b . . . . The computer terminals of the individual persons are coupled to each other through a terminal LAN or a public circuit so that various kinds of message communications may be carried out among the personal agents 800a, 800b . . . .

Each of the personal agents 800a, 800b . . . operates on the basis of a knowledge data base inherent to each user in a self-monitored fashion without resorting to assistance of each user to prosecute an intended job while interacting with the user or communicating with another personal agent as necessary.

The personal agent 800a comprises a plurality of agents corresponding to various objects, such as a conference sponsor agent 830a, a schedule management agent 840a and an appointment agent 850a. The personal agent 800a carries out an intended processing by interacting with the user 810a through a user interface agent 820a and cooperating with other agents. The personal agent 800b also comprises a set of a plurality of agents corresponding to various kinds of objects, such as a conference sponsor agent 830b, a schedule management agent 840b and an appointment agent 850b, and the remaining personal agents 800c . . . are also constructed similarly.

To support the scheduling of a conference, there are provided in the computer system a conference room agent 920 for managing utilization conditions of a conference room and an accounting agent 930 for processing traveling expenses as well as a personal information management agent 910 for searching, in an organization, a partner having knowledge and information which a conference sponsor wants to know and for making an appointment with the partner.

Each of the schedule management agents 840a, 840b . . . receives a conference scheduling notice message from each of the conference sponsor agents 830a, 830b . . . , an appointment request message from each of the appointment agents 850a, 850b . . . and schedule information concerning days off, utilization of flextime, personal affairs and the like, the schedule information being input by each of the users 810a, 810b . . . by itself through each of the user interface agents 820a, 820b . . . . The received schedule information is registered as personal schedule information if it does not matter. When a plurality of schedules overlap each other, they are adjusted and a selected schedule is registered.

An organization agent 860 corresponding to a hierarchy of organization in a company executes a processing for smoothly proceeding with schedules for an event and a conference to be held in accordance with the hierarchy of organization by communicating with the respective personal agents. For example, a company agent 870 sends schedule information regarding holidays and events set up throughout the company to the schedule management agents 840a, 840b . . . of the respective personal agents and registers the schedule information as a schedule. A division agent 880 manages to settle event schedule information on holidays and events, such as recreation, disaster preventive discipline and announcement session which are set up by a division, in accordance with a unit of organization, a department agent manages to settle schedule information on social events and regular conferences to be held in a department also in accordance with a unit of organization, and a section agent 900 manages to settle event schedule information on events to be held in a unit of section also in accordance with a unit of organization. The schedules are sent to the respective schedule management agents 840a, 840b . . . of the respective personal agents and are registered as personal schedules after attendance or absence is confirmed as necessary, thereby ensuring that laborious operation for inputting schedules which are set up by an organization can be omitted to permit smooth execution of organizational events.

Figure 4:
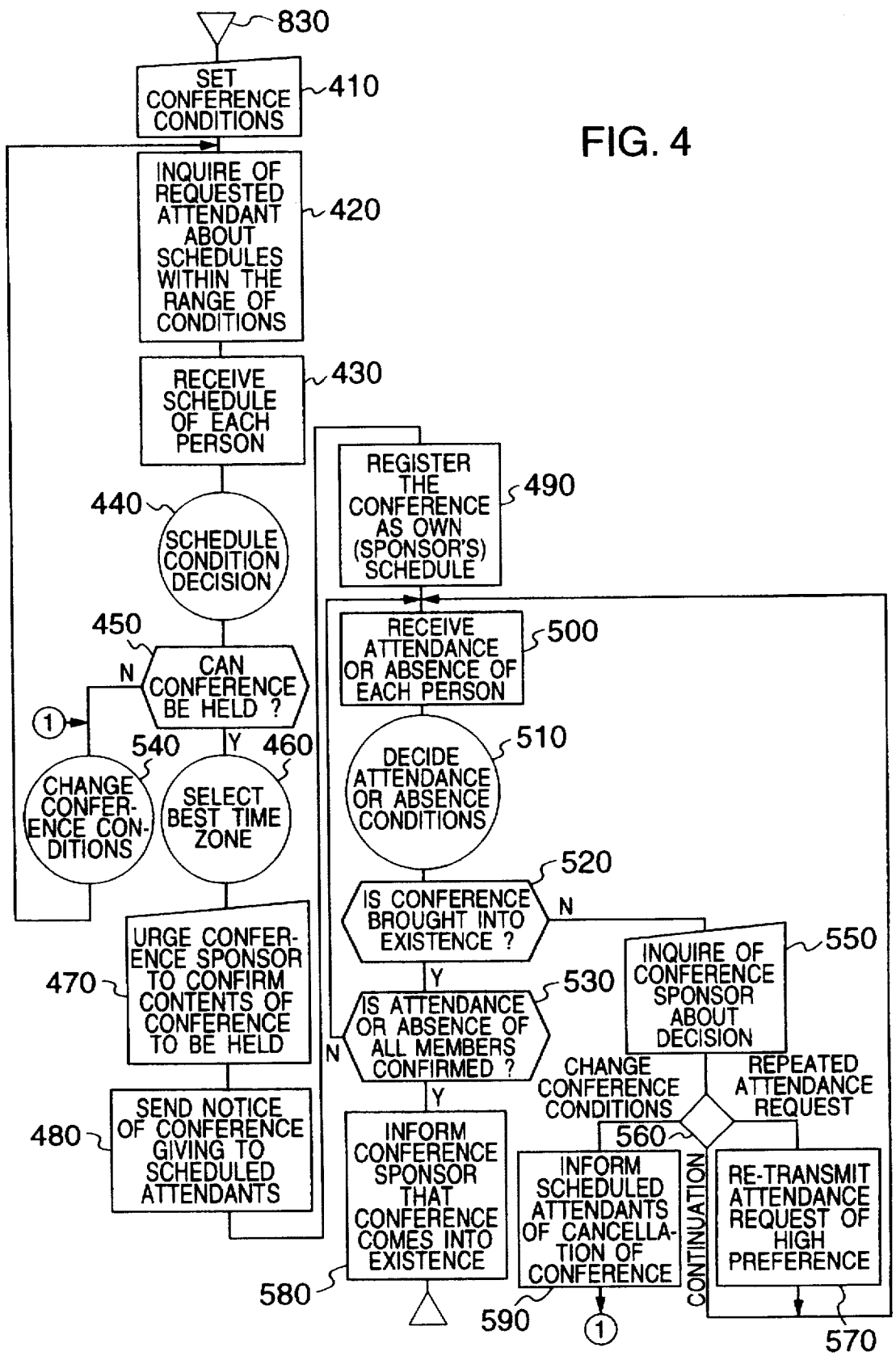
FIG. 4 is a flow chart of the processing by a conference sponsor agent in the support system according to the present invention.

Referring now to FIG. 4, adjustment of a schedule for giving of a conference will be described. Illustrated in FIG. 4 is a flow chart of a processing executed by the conference sponsor agent 830a in the personal agent 800a. The processing can be executed in personal agents in a similar way.

Firstly, when user 810a designates a conference under a certain name through the user interface agent 820a, the conference sponsor agent 830a responds to the contents of the designation to perform step 410 in which conference conditions for planning the conference, such as the name of the conference, the conference date, the conference place, persons who are desired to attend the conference, the subjects of the conference and the preference thereof, are set.

Figure 6:
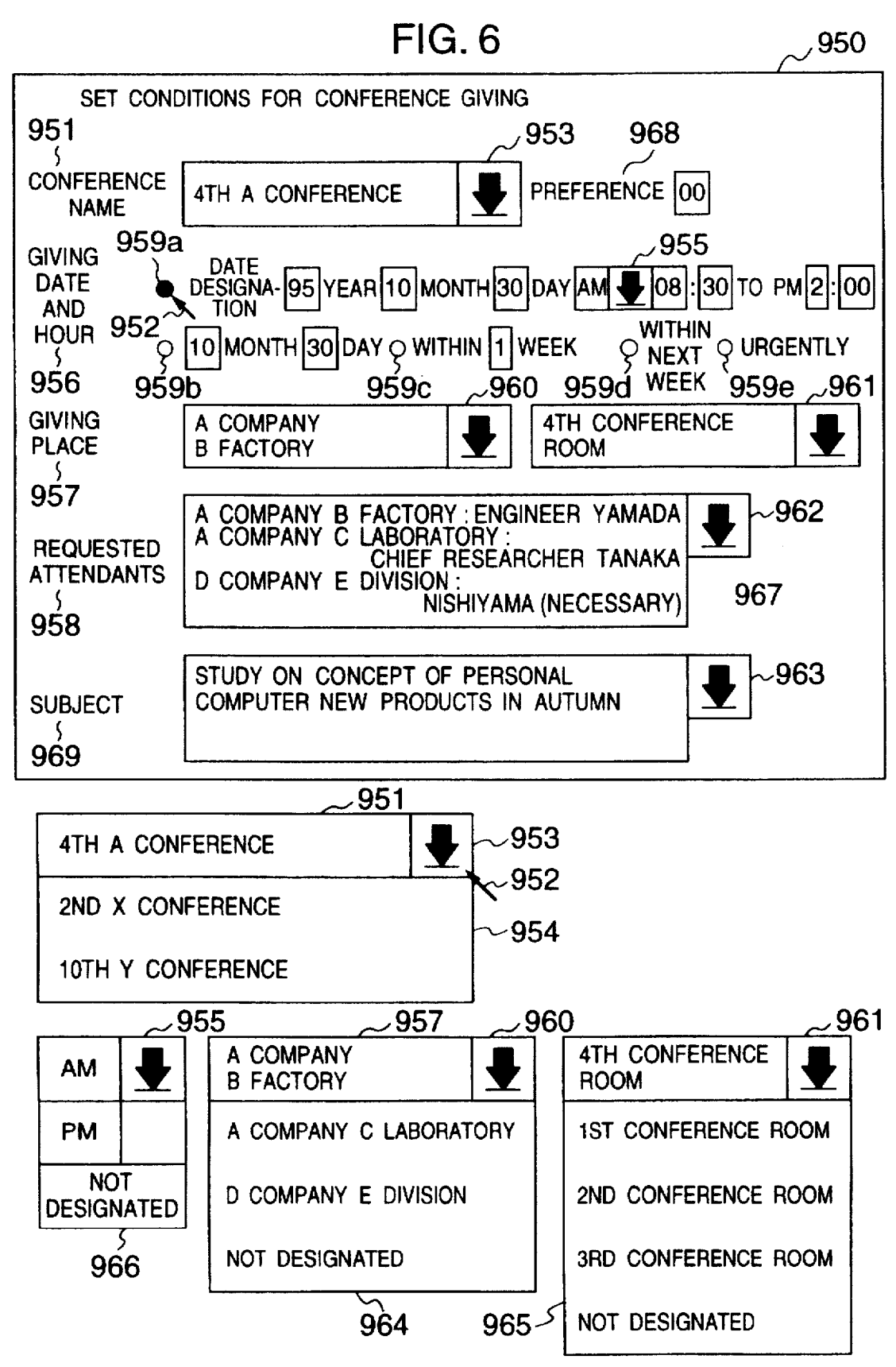

Shown in FIG. 6 is an example of a conference condition setting screen 950 managed by the user interface agent 820a in this step. The user moves a mouse cursor 952 to conference name 951 and operates a keyboard to input a name of the conference. When a button 953 at the right end of input column is designated by the mouse cursor 952, the user interface agent 820a consults past conference names stored in schedule data of the user in order that when a series of conferences under a certain name have proceeded to an N-th one, an indication of "the (N+1)-th" is added to the conference name and a list 954 of names of practicable conferences is displayed. Conceivably, the conference names can be arranged in the list 954 in the order of conferences held recently or in the order of conference giving frequencies during a period between the present and a fixed past date. The user can afford to set the conference name 951 by merely selecting a conference desired to be held from the list 954.

When the conference name 951 is input and then the cursor is moved to another item or a conference is selected from the conference name list 954, past history information of the conference is consulted to automatically display requested attendants 958 picked up from members of the highest attendance frequency so as to initially display a conference place 957 of the highest giving frequency. Like inputting of the conference name 951, requested attendants 958 and subject 969 can be changed by selecting other ones from the past history information pieces displayed when buttons 960, 961, 962 and 963 are clicked by means of the mouse cursor 952 or can be changed by inputting letters from the keyboard.

The user is not always required to effect strict designation up to the conference room in connection with the conference place 957 and for example, if reservation conditions of the reference room are unknown, then designation of only a division name will suffice. Alternatively, if the conference may be held anywhere, the designation of place is unneeded. A division name can be selected from a division list 964 displayed by designating the button 960 or a choice of "not designated" may also be selected. A conference room name can be selected from a list 965 of conference rooms in the division displayed by designating the button 961 or a choice of "not designated" may also be selected.

With only a division name designated, the number of persons in a first candidate list of requested attendants 958 is sent to the conference room agent 920 to inquire whether a usable conference room is available. If available, the conference room is provisionally reserved but if it is unavailable, a notice to this effect is transmitted to a sponsor and then the division name is changed automatically, followed by inquiry (search) of the conference room agent 920 in the updated division. The search is repeated until a place is found and displayed. With the conference place undesignated, the availability of conference rooms is checked in sequence starting from a place which is utilized most frequently by consulting past conference history information. If an unoccupied conference room is found, it is reserved and is designated as a first candidate for giving place 957 by displaying division and conference room names.

For conference date and time 956, type 959a for numerically designating the date and time or type of fuzzy expression having a breadth such as "afternoon of X day of X month", "around X day of X month", "within one week", "within next week" and "urgently" can be selected by selecting one of buttons 959b to 959e by means of the mouse cursor 952. Even when numerically designating the date and time, it is not always necessary to strictly designate all numerical values so that columns of date and hour may remain unfilled or a choice of "not designated" may be selected and displayed for selection of AM/PM by designating the button 955 to that choice. When part of setting input of the date and time is omitted, the conference schedule is adjusted within the range designated by the set information. For example, when only a condition of year, month and day is set, the conference is so adjusted as to be held within a certain time zone of the that day; and when designation extends up to AM/PM, the conference is so adjusted as to be held within a time zone in the morning or afternoon of that day.

Members who have attended a series of past conferences at a predetermined or more frequency are displayed as candidates for requested attendants 958. Of the members, an "important member" who is desired to necessarily attend may also be set. In this example, an important member is clarified by inputting a "necessary" mark 967 following the person name. It is to be noted that the conference sponsor is automatically handled as an "important member".

Preference 968 of the conference can be set numerically. The initial value of the preference indicates a mean preference of a series of past conferences designated by the conference name 951 and the closer to "O" the initial value, the higher the preference becomes. The preference can be changed freely by the user.

When receiving the conference conditions set by the user 810a in step 410 as described previously from the user interface agent 820a, the conference sponsor agent 830a proceeds to step 420. In step 420, the conference conditions are notified to the respective schedule management agents 840a, 840b ... of the personal agents 800a, 800b ... of the requested attendants, including the conference sponsor, so as to inquire of them about schedule conditions of individual persons.

Responsive to the inquiry, each of the schedule management agents 840a, 840b ... of the personal agents 800a, 800b ... answers an available time zone for attending a conference within a given range. If not accommodated, an answer may be a proposal for partial change of the conditions set by the conference sponsor.

When receiving all messages in step 430, the conference sponsor agent 830a proceeds to step 440 in which schedule conditions are decided. Then, in step 450, it is decided whether the conference is to be held. If the schedule is not met under the set conditions and the conference cannot be held, the program proceeds to step 540 in which the conference conditions are changed and then the program returns to the step 420 in which schedules of the requested attendants are again inquired. This route is repetitively traced until a schedule for permitting the conference to be held can be settled on. In the conference condition change carried out in step 540, the contents of an answer proposed by requested attendants, such as "change of place to X is desired" or "extension to X day of X month or after is desired", is first reflected on the condition change. If, even in this phase, the conference giving conditions are not met or no proposal is made by the requested attendants, the condition for the date is mitigated on trial. For example, a condition of "afternoon" is excluded from "in the afternoon of X day of X month", "around X day of X month" is extended to "one day to two days before or after X day of X month", or "within one week" is changed to "within two weeks" and inquiries are again made.

When requested attendants who cannot meet the schedule belong to a certain division, the conference place is changed to that division and inquiries are again made.

If the schedule is met to permit the conference to be held, the program proceeds to step 460 in which an optimum time zone is selected within which all members are available to attend and then the program proceeds to step 470 in which the conference sponsor is urged to confirm the contents of the conference to be held.

When the conference sponsor has accepted the conference contents, the program proceeds to step 480 in which a formal notice of the conference is sent to the requested attendants and then the program proceeds to step 490 in which the contents of the conference to be held is sent to the schedule management agent 840a of the conference sponsor so as to be registered therein.

In step 460 in which the optimum time zone is selected from the time zone within which all members are available to attend, the conference start time is determined in increments of a minimum of to 30 minutes and candidates given in terms of the minimum unit hour are enumerated. Then, in connection with each of the candidates, it is checked whether a conference room at the conference place which can accommodate the number of requested attendants is unoccupied by inquiring the conference room agent 920, and one of the candidates for a time zone within which the conference room is unoccupied is focused on. Further, when the requested attendants contain a person (or persons) who works for another division, the time required for movement from that division to the conference place is taken into consideration to exclude a candidate for a time zone which lies early in the morning to make arrival within this time zone impossible. In the possible time zone, the time zone of the conference hour which begins after the business start or after the lunch time or begins without fraction, for example, 10:00, 11:00, 13:00, 14:00 or 15:00 is made to be higher priority; otherwise, the hour devoid of fraction as far as possible, for example, a unit of one hour or a unit of 30 minutes is searched and the preference of the candidates therefor is made to be high.

The preference is changed in accordance with information on a conference date designated by the conference sponsor. When "around X day of X month" is designated in the conference conditions, the preference of a candidate for X day of X month is made to be the highest and the preference of nearby dates is made to be of second highest preference. When "within one week" is designated, the preference of a candidate for a date which is about three days later is made to be the highest in anticipation of the time required for the conference giving notice to reach the requested attendants and the preference of candidates for dates near the three-day later date is made to be higher in proportion to hierarchical closeness to the three-day later date. When "urgently" is designated, a candidate for an earlier date has a higher preference.

Further, to select an optimum one of the candidates, knowledge of information concerning the individual persons that is possessed by the conference sponsor agent 830a is utilized. For example, of the past conference times, a time zone adopted at a higher frequency is given a higher preference. It is checked what day of the week the past conferences were held on at the highest frequency and a candidate for a weekday on which the conference was held at a higher frequency is given a higher preference. Further, a series of past conferences is checked for intervals at which they were held and a date approximating an average interval is given a higher preference.

In the confirmation in step 470, the evaluation of preference as described above is carried out and then the candidates are presented to the conference sponsor in the order of the height of preference so as to be acknowledged. At that time, the candidates may be arranged and presented in the order of preference or a candidate of the highest preference is first presented and when the candidate is rejected by the conference sponsor, the second best candidate may be presented.

After the conference giving notification is transmitted, the program proceeds to step 500 in which reception of an answer regarding attendance or absence from each of the personal agents 800b, 800c . . . of the respective persons is awaited and each time that the answer of attendance or absence is received, the program proceeds to step 510 in which attendance or absence conditions are decided. In the attendance or absence decision, it is determined whether the percentage of attendance is below a predetermined value, whether an "important member" of the conference is absent or whether there is a requested attendant (or attendants) who does not reply regarding attendance or absence even immediately before the conference giving date. Then, the program proceeds to step 520 in which the possibility of scheduling the conference is decided. When it is determined that there is a fear of not scheduling the conference, the program proceeds to step 550 in which the reasons therefore and the possibility that the conference will not be held are notified to the conference sponsor to inquire of the conference sponsor regarding how to handle the situation.

When the conference sponsor responds to the inquiry to select "change of conference conditions", the program branches through step 560 to step 590 in which cancellation of the conference is sent to scheduled (requested) attendants who have already declared attendance to the conference and the program returns to the step 540 in which the schedule is readjusted by changing the conference conditions so that they may be mitigated. When a "repeated attendance request" is selected, the program branches through step 560 to step 570 in which a conference giving notification/attendance request of high preference (describing the changed contents of conference giving) is again transmitted. Handling of this conference giving notification/attendance request is left up to the schedule management agents 840b receiving this notification. If "continuation" is selected, the program returns through step 560 to step 500, confirmation of attendance or absence is continued with scheduling the conference by temporarily neglecting a raised problem. When the problem raised at that time is absence of an "important member", the requested attendant is removed from the designation of the "important member" or when a low percentage of attendance is problematic, the preset lower limit of the percentage of attendance is decreased and the confirmation of attendance or absence is continued.

When answers of attendance or absence from all requested attendants are confirmed, the program proceeds to step 580 in which the conference sponsor is informed that the conference is scheduled and the job of conference schedule adjustment ends.

Figure 5:
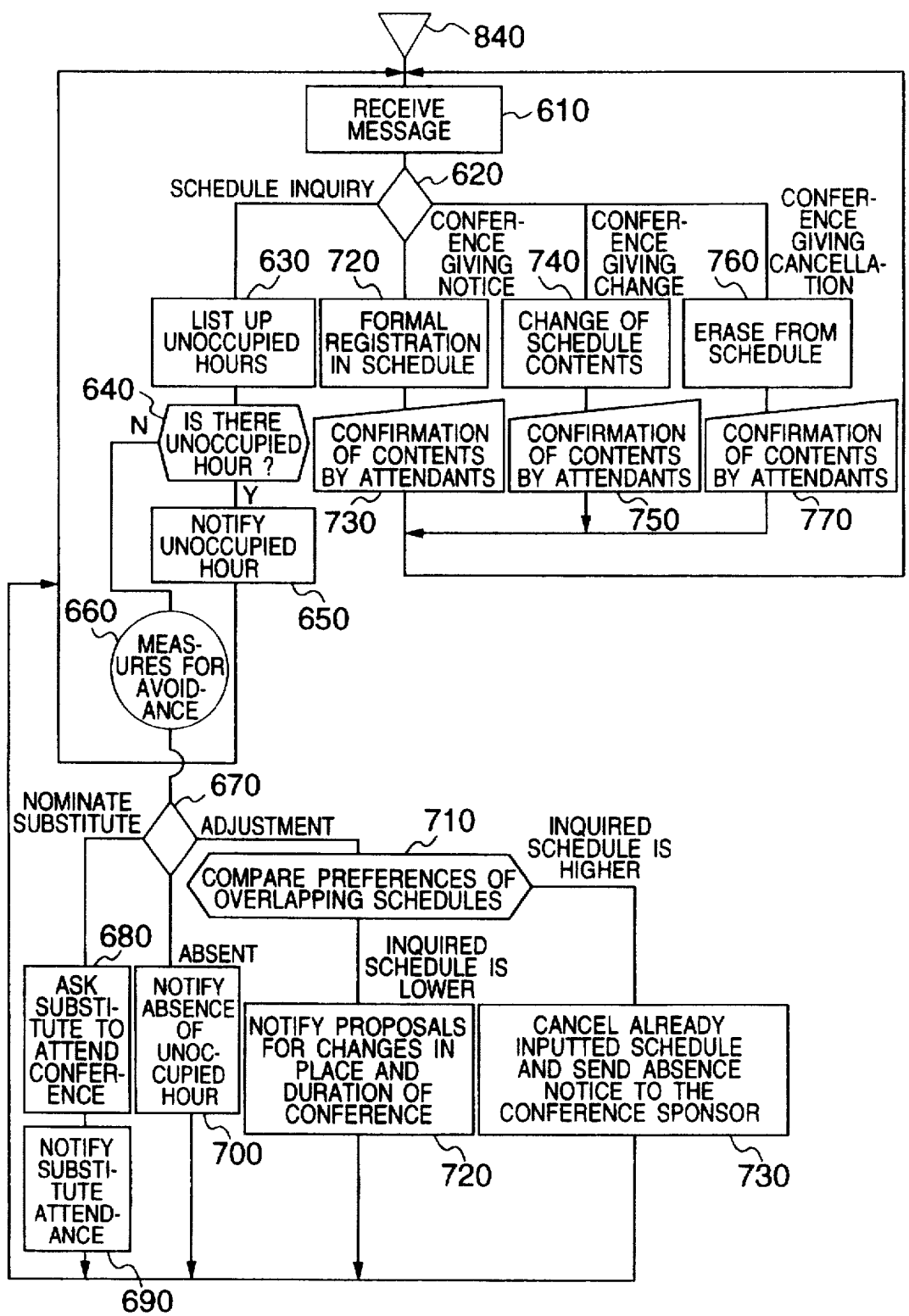
FIG. 5 is a flow chart of the processing by a schedule management agent in the support system according to the present invention.

Next, the schedule management agent 840a will be described with reference to a flow chart of FIG. 5. The remaining schedule management agents 840b, 840c . . . operate similarly.

The schedule management agent 840a is ready for receiving a message from another agent and when a message is received in step 610, the contents of the message are analyzed and the program proceeds to step 620 in which branching is carried out in accordance with the contents.

When the message is a schedule inquiry, the program branches to step 630 in which the time available for scheduling a conference within the range of an inquired date are first listed. At that time, if the conference place has been listed in the form of message information, the time required for movement from the division or business place to the conference place is subtracted to determine a time zone within which attendance is actually possible. Then, in step 640, the presence or absence of available time is confirmed and when time is available, the program proceeds to step 650 in which the available time is notified to the agent who has made the schedule inquiry. In the absence of any available time, the program branches to step 660 in which measures to find free time, and the measures are decided in step 670.

In the decision step 670, information regarding a preference contained in the schedule inquiry message and used as a decision criteria is consulted. For example, when the preference is lower than a constant value A, absence from the conference is determined and the program branches to step 700 in which a message indicating that there is no available time for the conference is sent to an agent who has made the schedule inquiry. When the preference is higher than A but lower than a constant value B which is higher than A, a substitute is determined and the program branches to step 680 in which the personal information management agent 910 is retrieved so that a person who is preferably outranked in staff organization and in charge of a job corresponding to the subject matter of the conference may be selected from his/her own subordinates and a selected subordinate may be asked to attend the conference as a substitute. In order to ask the substitute to attend the conference, a conference sponsor agent requests attendance of the substitute according to the processing operation shown in FIG. 4. But when a message indicating no available time is returned from the schedule management agent for the substitute whose attendance is requested, the person who has been desired to be attend as the substitute is changed to a second candidate in the conference condition change in step 540 to search a person who can attend as a substitute. If a substitute attendant is found, the program proceeds to step 690 in which attendance of the substitute attendant is sent to the conference sponsor.

When the preference is higher than B, the program branches in order to perform an adjustment processing which can make the possibility of attendance as high as possible. For the adjustment processing, the preference of the schedule which has already been input is compared with that of a newly inquired schedule in step 710 and when the preference of the already input schedule is higher, the program branches to step 720 in which proposals for changes in the date and place of the conference determined from possible available times for attendance to the conference are sent in reply to the newly inquired schedule. When the preference of the newly inquired schedule is higher, the program branches to step 730 in which the already input schedule is canceled and notice of absence from the conference is sent to the conference sponsor of that schedule. When the schedule management agent receives the conference schedule from the conference sponsor agent (610), the conference contents are formerly registered (740) to inform a manager of the schedule or an attendant by use of sounds or a change on a display to make him or her confirm (750) the conference contents. Similarly, when (760) a conference condition change message, the registered schedule is changed (740) to inform a manager of the schedule and thereby request confirmation (770) of the contents. Similarly, when a conference cancel message (780) is received, the conference contents are deleted from the schedule. A manager of the schedule will be also informed by use of sounds or a change on a display for confirmation of the contents (790).

With the support system as described above, one of the conference sponsor agents 830a . . . selects an optimum time zone from the schedules of the requested attendants corresponding to the range of dates and times for holding the conference desired by the conference sponsor, and the conference sponsor agent 830a further selects an optimum place from possible conference places to automatically determine a conference schedule meeting the conditions desired by the conference sponsor. The conference sponsor agent 830 carries out notification of the conference to the respective requested attendants and manages attendance at the conference without requiring handling by the conference sponsor in a self-monitored fashion, so that the conference sponsor and the requested attendants can be freed from peripheral jobs such as schedule adjustment necessary for the conference and reservation of a conference room, and therefore can efficiently be engaged in more essential jobs.

By selecting an optimum time zone from the schedules of the requested attendants on the basis of the range of dates and times for holding the conference desired by the conference sponsor and selecting an optimum location from possible conference places, a conference schedule under the desired conditions can be determined automatically, thereby ensuring that the conference sponsor and the requested attendants (users) can be freed from making schedule adjustments necessary for the conference and can efficiently be engaged in more essential jobs. In determining the conference schedule, unoccupied schedules of all requested attendants are obtained precedently to select and set the most suitable time zone, so that the number of absentees can be decreased and the conference can be held smoothly.

A first practical form of the information processing apparatus constituting the user interface agent 820a or 820b of FIG. 3 will now be described.

An information processing apparatus comprises processing means for executing processings, input value acquiring means for acquiring an input value of a parameter necessary for the processing means to execute a processing, allowable value determining means for determining an allowable value to be added to the input value acquired by the input value acquiring means in accordance with information supplied from the processing means, and allowable value adding means for determining a different input value inclusive of the acquired input value or another different value exclusive of the acquired input value by adding the allowable value determined by the allowable value determining means to the input value acquired by the input value acquiring means.

The input value acquiring means acquires an input value of a parameter necessary for the processing means to execute a processing from input information by a physical input unit such as a switch, operational information by a controller (graphic user interface such as a slide switch or a rotary dial) which is displayed on the screen or information input (numerical values/letters/commands) by a keyboard.

For example, the input value acquiring means acquires an input value "2" when a user operates a knob of a rotary dial displayed on the screen to set it to a position indicative of "2".

The allowable value determining means responds to information supplied from the processing means to determine an allowable value to be added to the input value acquired by the input value acquiring means.

Alternatively, the allowable value determining means may determine an allowable value to be added to the input value acquired by the input value acquiring means by selecting one of a plurality of allowable values, and the processing means may respond to information concerning a parameter (for example, the kind of the parameter) to provide information for specifying an allowable value to be selected by the allowable value determining means.

For example, in connection with the parameter "number of print copies" which is necessary for executing print processing, sheets need not be printed by a number other than the number indicated by an input value set by the user and therefore, the processing means provides information for specifying an allowable value "0.0". Further, for example, in connection with the parameter "print density" which is also necessary for executing the print processing, the processing means provides information for specifying an allowable value "1.0" in preparation for the case where an input value set by the user is improper.

By adding an allowable value determined by the allowable value determining means to an input value acquired by the input value acquiring means, the allowable value adding means determines a different input value inclusive of the acquired input value or another different value input value exclusive of the acquired input value.

For example, when the input value acquired by the input value acquiring means is "2", the allowable value adding means determines only an input value of "2(=2+0.0) for the parameter "number of print copies" and determines input values of "1(=2−1.0) and "3(=2+1.0) for the parameter "print density".

In this manner, the processing means can acquire an input value acquired by the input value acquiring means and an input value determined by the allowable value adding means and determine whether these input values are suitable for the processing to be executed, whereby the possibility that the processing means acquires proper input values through one operation by the user without cut and try can be increased.

Accordingly, the possibility that the input value set by the user is rejected can be reduced and the number of operations by the user can be reduced to thereby simplify use thereof.

The input value acquiring means can acquire a designation indicating whether an input value determined by the allowable value adding means is acknowledged by the user, and, in this case, allowable value learning means may further be provided for storing the contents of the designation acquired by the input value acquiring means in accordance with the kinds of parameters, and the allowable value determining means may modify the determined allowable value on the basis of the storage contents of the allowable value learning means.

Next, a second practical form of the information processing apparatus will be described.

An information processing apparatus comprises processing means for executing processings, input value acquiring means for acquiring an input value of a parameter necessary for the processing means to execute a processing, and an allowable value adding means for determining a different input value inclusive of the acquired input value or another different value exclusive of the acquired input value by adding an allowable value corresponding to information concerning the parameter supplied from the processing means to the input value acquired by the input value acquiring means.

The second practical form differs from the first practical form in that the allowable value determining means is omitted because the processing means supplies an allowable value corresponding to information concerning the parameter (for example, the kind of the parameter) to the allowable value adding means.

The input value acquiring means can acquire a designation indicating whether an input value determined by the allowable value adding means is acknowledged by the user, and, in this case, there are further provided allowable value learning means for storing the contents of the designation acquired by the input value acquiring means in accordance with the kinds of parameters and allowable value modifying means for modifying an allowable value added by the allowable value adding means on the basis of the storage contents of the allowable value learning means.

Next, a third practical form of the information processing apparatus will be described.

An information processing apparatus comprises processing means for executing processings, input value acquiring means for acquiring an input value of a parameter necessary for the processing means to execute a processing and an allowable value to be added to the input value, and allowable value adding means for determining a different input value from the acquired input value by adding the allowable value acquired by the input value acquiring means to the input value acquired by the input value acquiring means, whereby the processing means decides whether the input value acquired by the input value acquiring means and the input value determined by the allowable value adding means are suitable for the processing to be executed.

The third practical form differs from the first practical form in that the allowable value determining means is omitted because the input value acquiring means acquires an allowable value and the thus acquired allowable value is supplied to the allowable value adding means.

The processing means may handle the input value acquired by the input value acquiring means in preference to the input value determined by the allowable value adding means.

The input value acquiring means may acquire a weight value representative of a value of weighting set by the user or the processing means, and the processing means can distinctively handle the input value acquired by the input value acquiring means and the input value determined by the allowable value adding means by assigning weight values acquired by the input value acquiring means to the input value acquired by the input value acquiring means and the input value determined by the allowable value adding means, respectively.

One embodiment of the information processing apparatus shown in FIGS. 7 to 14 will be described.

The present embodiment is concerned with the first practical form.

Figure 7:
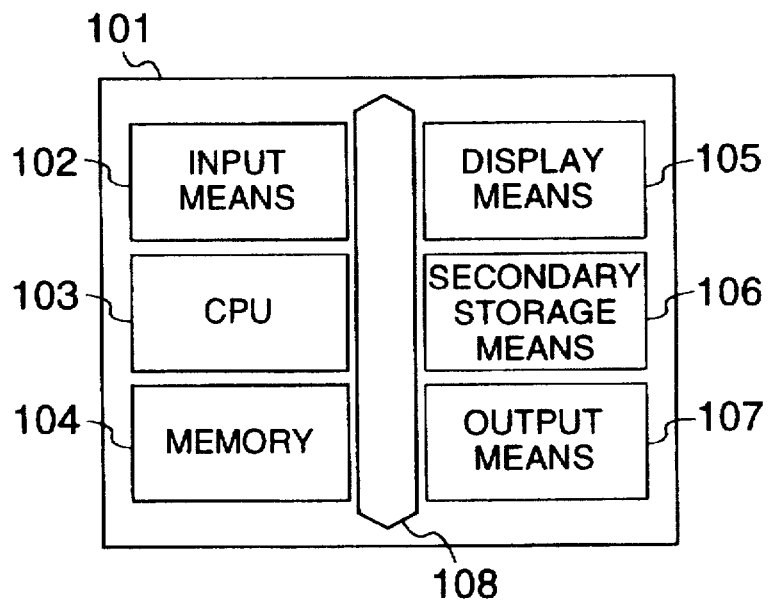
FIG. 7 is a diagram showing the construction of a first embodiment of an information processing apparatus according to the present invention.

An information processing apparatus of the present embodiment is constructed as shown in FIG. 7.

Referring to FIG. 7, the information processing apparatus designated by 101 comprises input means 102 such as a keyboard or a mouse, a CPU 103 for controlling the information processing apparatus 101, a memory 104 including a RAM or ROM for storing programs and data, display means 105 including, for example, a liquid crystal display, a VRAM or a display controller, secondary storage means 106 such as a hard disc or a PC card, output means 107 such as a printer or a voice reproducing unit, and a bus 108.

Figure 8:
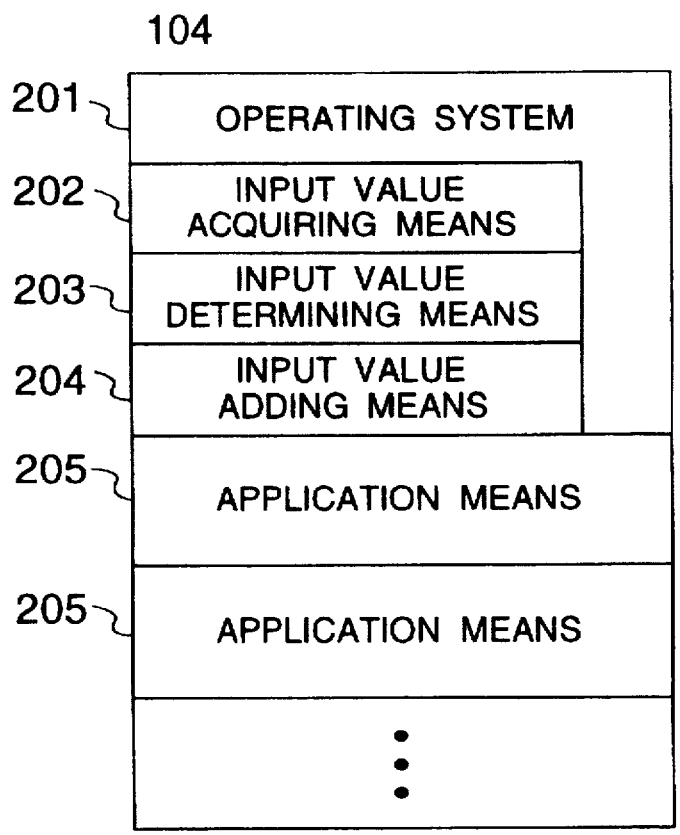
FIG. 8 is a diagram showing the structure of a memory in the first embodiment.

The memory 104 is constructed as shown in FIG. 8.

In FIG. 8, an operating system (OS) 201 performs resource management, task management or the like of the information processing apparatus 101 and is used in common for programs executed by the information processing apparatus 101.

Denoted by 202, 203 and 204 are input value acquiring means, allowable value determining means and allowable value adding means, respectively, whereby these means 202, 203 and 204 are part of the OS 201. Application means 205 practically uses an input value to realize various types of processings such as word processing or table calculation.

The input value acquiring means 202 responds to a request from the application means 205 to acquire an input value of a parameter necessary for executing a processing to be realized by the application means 205. The allowable value determining means 203 and allowable value adding means 204 are characteristic of the present embodiment and will be detailed later.

While in the present embodiment the input value acquiring means 202, allowable value determining means 203 and allowable value adding means 204 are realized in the form of programs which are of software in order that the operation of the present embodiment is realized when the CPU 103 executes a program, they may otherwise be realized with dedicated hardware independent of the CPU 103 or with a composite structure of hardware and software.

In the present embodiment, the program requiring an input value of a parameter is the application means 205 but it may otherwise be another program such as the OS 201 or a driver BIOS.

In the present embodiment, the individual means on the memory 104 are arranged statically as shown in FIG. 8 when, for example, the information processing apparatus 101 is started but they may otherwise be arranged dynamically.

Figure 9:
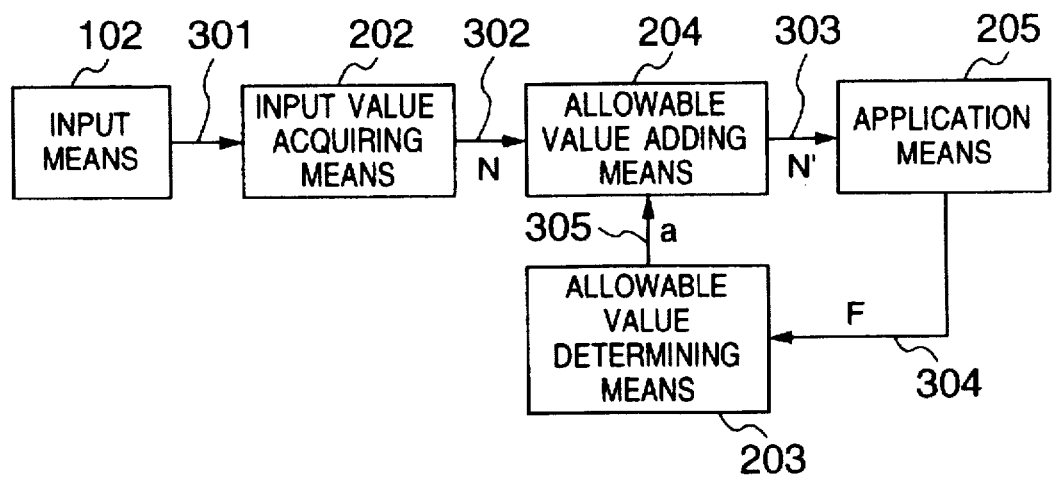
FIG. 9 is a block diagram for explaining operational relation between individual means in the first embodiment.

The individual means shown in FIG. 8 are related to each other in operation as shown in FIG. 9.

Referring to FIG. 9, a mouse is used as the input means 102 in the present embodiment.

Figure 10:
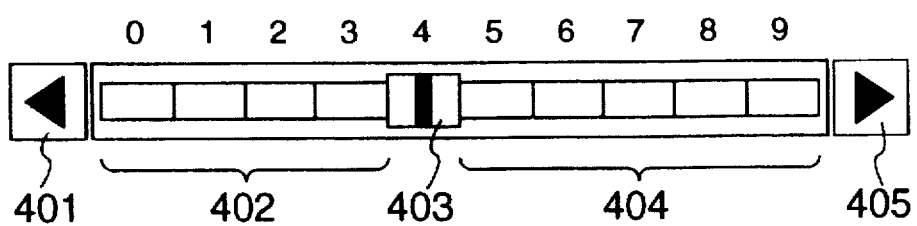
FIG. 10 is a diagram showing an example of an input value setting screen in the first embodiment.

Firstly, when the application means 205 requires an input value of a parameter, the input value acquiring means 202 causes the display means 105 to display an input value setting screen as shown in FIG. 10 and an input value N 302 is acquired in accordance with movement information/button depression information 301 of the mouse 102 delivered out of the mouse 102 as the mouse 102 is operated.

More particularly, when an arrow button 401 in the input value setting screen is designated by the mouse 102 and the mouse 102 is clicked, the input value acquiring means 202 moves a knob 403 by a prescribed amount to the left. With a region 402 designated by the mouse 102 and the mouse 102 is clicked, the knob 403 is moved by a prescribed amount to the left. When an arrow button 405 is designated by the mouse 102 and the mouse 102 is clicked, the knob 403 is moved by a prescribed amount to the right. With a region 404 designated by the mouse and the mouse 102 clicked, the knob 403 is moved by a prescribed amount to the right.

It is to be noted that the knob 403 is moved by a larger amount when the region 402 or 404 is designated by the mouse 102 and the mouse 102 is clicked than when the arrow button 401 or 405 is designated by the mouse 102 and the mouse 102 is clicked.

When the coordinate position is moved (dragged) while keeping the knob 403 designated by the mouse 102 and the mouse 102 is clicked, the knob 403 is moved to meet a coordinate position after movement.

Further, the input value acquiring means 202 determines an input value N 302 corresponding to a scale between "0" and "9" at which the knob 403 is positioned and delivers the thus determined input value N 302 to the allowable value adding means 204. In an example shown in FIG. 10, the input value N 302 determined by the input value acquiring means 202 is "4".

The method for realization of the input value acquiring means 202 is a technique widely used as, for example, a graphic user interface (GUI).

Returning to FIG. 9, when information regarding whether an allowable value is added to the input value of the parameter or the allowable value is added in accordance with the kind (utilization) of parameter requiring the input value or conditions at that time, the application means 205 delivers, as allowable value calculating method designating information F 304, information as to what allowable value is added (allow able value calculating method) to the allowable value determining means 203.

The contents of the allowable value calculating method designating information F 304 may be determined fixedly in advance in accordance with each of the kinds of parameters and conditions but it may otherwise be supplied by the user to the application means 205 in advance in accordance with each of the kinds of parameters and conditions.

The allowable value determining means 203 responds to the contents of the allowable value calculating method designating information F 304 delivered out of the application means 205 to determine an allowable value a 305 to be added to the input value N 302 by means of the allowable value adding means 204 and delivers the thus determined allowable value a 305 to the allowable value adding means 204.

The allow value adding means 204 determines an input value N' 303 to be delivered to the application means 205 by adding the allowable value a 305 delivered out of the allowable value determining means 203 to the input value N 302 delivered out of the input value acquiring means 202 and delivers the thus determined input values N' 303 to the application means 205.

Figure 11:
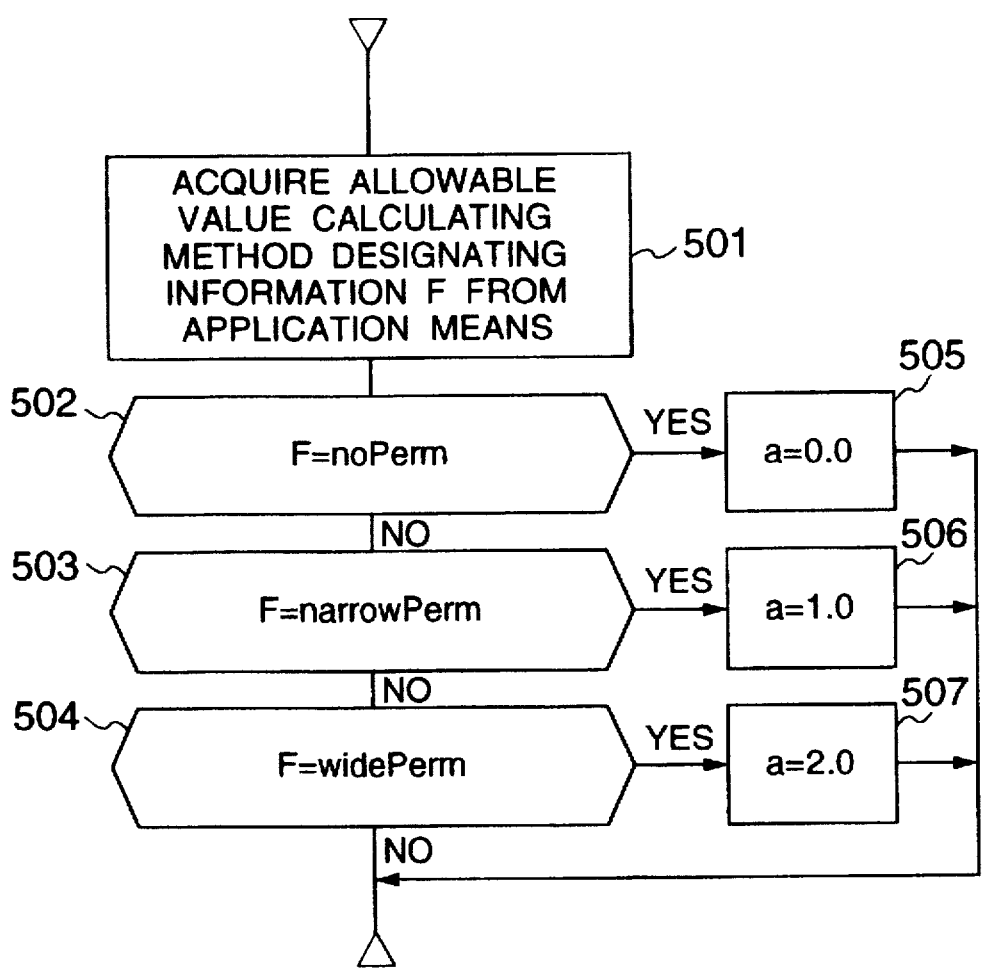
FIG. 11 is an operational flow chart of allowable value determining means in the first embodiment.

An operational flow chart of the allowable value determining means 203 is shown in FIG. 11.

The allowable value determining means 203 is a program arranged on the memory 104 and operation shown in FIG. 11 is realized when the CPU 103 executes the program.

As shown in FIG. 11, the allowable value determining means 203 first acquires allowable value calculating method designating information F 304 delivered out of the application means 205 (step 501).

Subsequently, in accordance with the contents of the allowable value calculating method designating information F 304 acquired in step 501, the program branches to steps 502 to 504, an allowable value a 305 is determined in step 505, 506 or 507 in accordance with each branching condition and the thus determined allowable value a 305 is delivered to the allowable value adding means 204.

In the present embodiment, three kinds of contents of the allowable value calculating method designating information F 304 are prepared including "noPerm" to the effect that no allowable value is added, "narrowperm" purporting that an allowable value of level 1 is added and "wideperm" purporting that an allowable value of level 2 is added. The allowable value determining means 203 causes the allowable value a 305 to be determined as "0.0" (step 505) when the allowable value calculating method designating information F 304 is "noPerm" (step 502), causes the allowable value a 305 to be determined as "1.0" (step 506) when the allowable value calculating method designating information F 304 is "narrowperm" (step 503) and causes the allowable value a 305 to be determined as "2.0" (step 507) when the allowable value calculating method designating information F 304 is "wideperm" (step 504).

While in the present embodiment the allowable value a 305 is determined by the allowable value determining means 203 through arithmetic calculation, the allowable value a 305 may otherwise be determined using a correspondence table between allowable value calculating method designating information F 304 and allowable value a 305.

Figure 12:
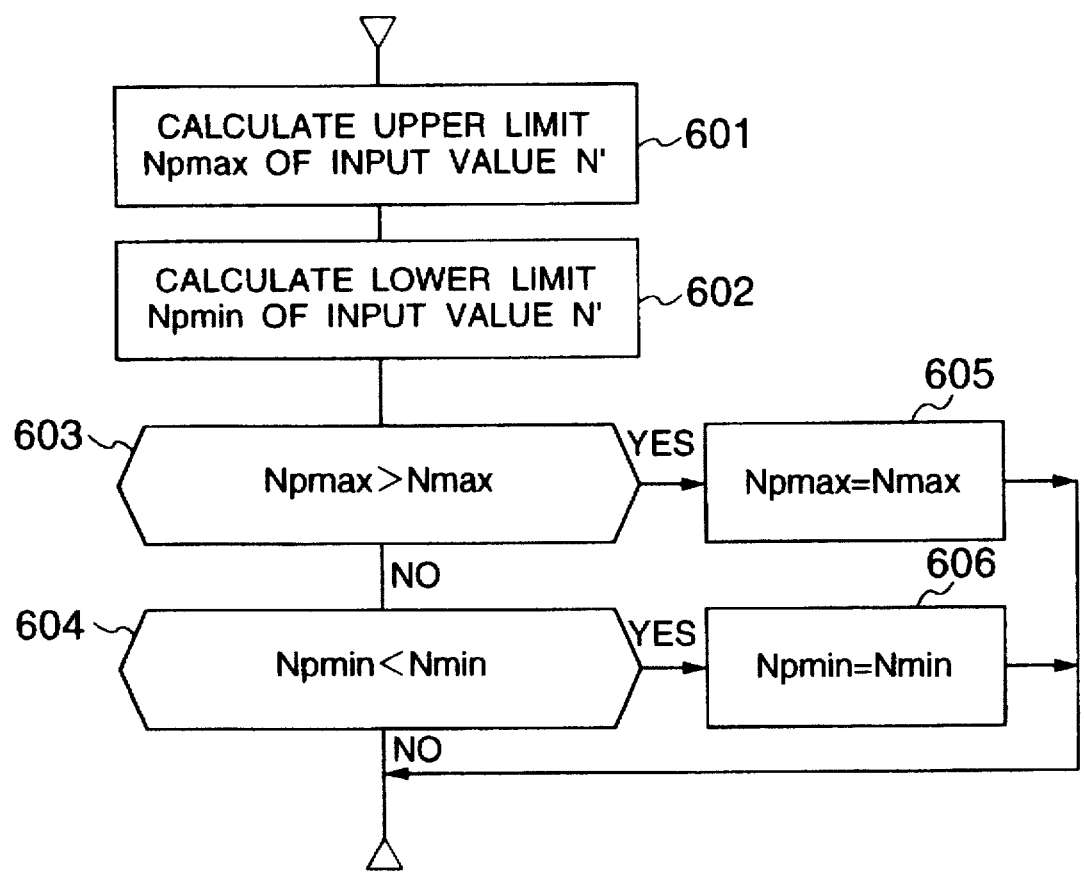
FIG. 12 is an operational flow chart of allowable value adding means in the first embodiment.

An operational flow chart of the allowable value adding means 204 is shown in FIG. 12.

The allowable value adding means 204 is a program arranged on the memory 104 and operation shown in FIG. 12 is realized when the CPU 103 executes the program.

As shown in FIG. 12, the allowable value adding means 204 first determines an upper limit Npmax of an input value N' 303 delivered to the application means 205 by adding an allowable value a 305 delivered out of the allowable value determining means 203 to an input value N 302 delivered out of the input value acquiring means 202 (step 601). Then, a low limit Npmin of the input value N' 303 delivered to the application means 205 is determined by subtracting the allowable value a 305 delivered out of the allowable value determining means 203 from the input value N 302 delivered out of the input value acquiring means 202 (step 602).

Subsequently, in steps 603 to 606, the range of upper limit Npmax or lower limit Npmin is checked and modified such that it does not exceed an absolute upper limit Nmax or absolute lower limit Nmin.

Accordingly, the contents of the input value N' 303 actually delivered to the application means 205 is the input value N 302, the upper limit Npmax or the lower limit Npmin.

By adding the allowable value to the set input value when the user operates the mouse 102 through the above operation in accordance with the kind of the parameter needing the input value and conditions at that time, the input value is allowed to have a large range. In other words, the application means 205 can acquire, in addition to the input value set by the user who operates the mouse 102, different input values from that set input value.

Specified advantages brought about by the present embodiment will now be described with reference to FIGS. 13 and 14.

For example, when the processing realized with the application means 205 is the print processing for printing a document file, input values of various parameters such as "number of print copies", "print start page", "print end page", "print speed" and "print quality" are needed for execution of the processing.

In the following description, specific advantages brought about by the present embodiment will be described by taking "print speed" and "print quality" of the parameters, for instance.

For example, when considering a case where the application means 205 determines the contents of allowable value calculating method designating information F concerning "print speed" as Fv=narrowPerm and the contents of allowable value calculating method designating information F concerning "print quality" as Fq=noPerm, the allowable value determining means 203 determines an allowable value a concerning "print speed" as av=1.0 and an allowable value a concerning "print quality" as aq=0.0 and delivers these allowable values to the allowable value adding means 204.

Figure 13:
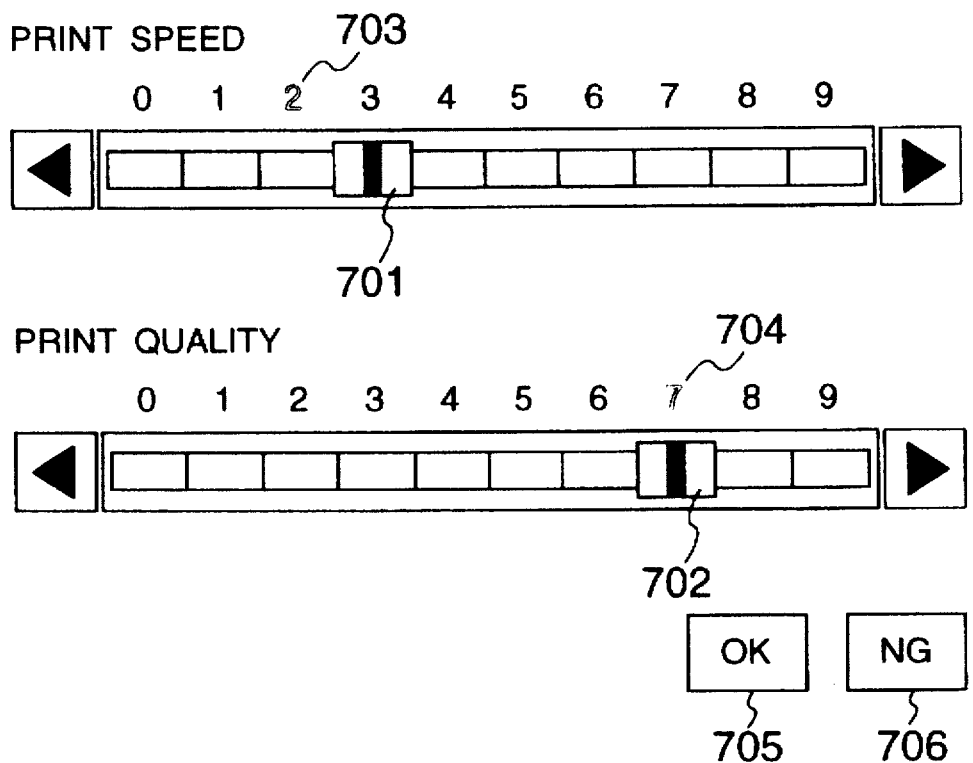
FIG. 13 is a diagram for explaining another example of the input value setting screen in the first embodiment.

On the other hand, as shown in FIG. 13, the user sets input values of "print speed" and "print quality" by operating the mouse 102 to move knobs 701 and 702. Then, the input value acquiring means 202 determines an input value N concerning "print speed" as Nv=3 and an input value N concerning "print quality" as Nq=7 and delivers these input values to the allowable value adding means 204. Accordingly, the allowable value adding means 204 determines an input value N' concerning "print speed" as including Nv=3, Nvpmax=3+1.0=4 and Nvmin=3-1.0=2 and an input value N' concerning "print quality" as including Nq=7, Nqpmax=7+0.0=7 and Nqpmin=7-0.0=7 and delivers these input values to the application means 205.

Thus, for the "print speed", the input value N actually set by the user is Nv=3 but the input value N' delivered to the application means 205 includes Nv=3, Nvpmax=4 and Nvmin=2.

When the input value N' is delivered out of the allowable value adding means 204, the application means 205 decides whether the delivered input value N' is proper. Since the "print speed" and "print quality" are parameters whose input values are correlated to each other, the correlation between the input value N' concerning "print speed" and the input value N' concerning "print quality" is examined.

Figure 14:
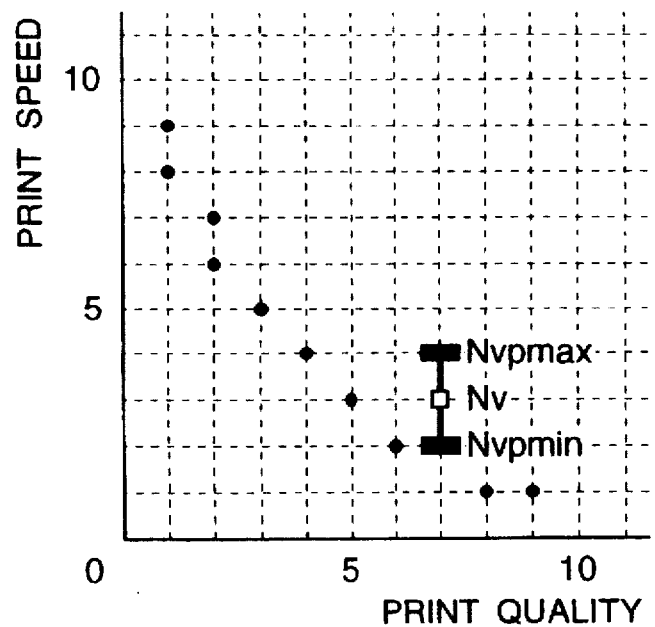
FIG. 14 is a graphic representation for explaining an example of a constraint condition under which pertinency between input values of parameters correlative to each other is maintained.

For example, when the input values of the "print speed" and "print quality" are so correlated as to stand under a constraint condition as shown in FIG. 14, input value N' concerning the "print quality" includes Nq=7, Nqpmax=7 and Nqpmin=7 and it will therefore be seen that a "print speed" meeting the constraint condition when the "print quality" is "7" is "2". On the other hand, input value N' concerning the "print speed" includes Nv=3, Nvpmax=4 and Nvpmin=2 and therefore, for the input value actually set by the user being Nv=3, the constraint condition cannot stand when the "print quality" is "7 but since Nvpmin=2 which is the input value added with the allowable value a by the allowable value adding means 204 meets the constraint condition when the "print quality" is "7", one operation by the user can permit the application means 205 to acquire suitable input values when the "print quality" and "print speed" are set to "7" and "2", respectively.

In the present embodiment, in order that the suitable input values which can be acquired by the application means 205 (here, "7" and "2") are notified to the user, the display form is changed as shown at 703 and 704 in FIG. 13. Then, when the user confirms (acknowledges) the notified input values by designating and depressing an OK button 705 by means of the mouse 102, the application means 205 executes the processing by using the acquired input values. The user can correct the set input values by simply designating and clicking a NG button 706 using the mouse 102.

As described above, according to the present embodiment, the input value can have a large range when the user adds an allowable value to a set input value by operating the mouse in accordance with the kind of parameter requiring the input value and conditions at that time, and therefore the possibility that the application means 205 can acquire a suitable input value without resorting to cut and try through one user's operation can be increased. Accordingly, the possibility that the input value set by the user is rejected can be reduced and hence the number of user's operations can be reduced, thereby simplifying use thereof.

Especially when input values of two parameters are so correlated as to stand under a predetermined constraint condition, the possibility that the constraint condition can stand can be increased to promote the effect of the present embodiment.

Parameters such as "number of print copies", "print start page" and "print end page" which need input values for execution of the print processing are parameters in which input values set by the user should not be added with allowable values. This is because when, for example, the user wishes to print two copies of a document file, there is no need of printing by other numbers.

Accordingly, for each of these parameters, the application means 205 determines the contents of allowable value calculating method designating information F as "noPerm" and the allowable value determining means 203 determines the allowable value a as "0.0" to deliver it to the allowable value adding means 204 which is in turn permitted to deliver the input value N acquired by the input value acquiring means 202 to the application means 205 as the input value N'.

Next, a second embodiment of the information processing apparatus will be described with reference to FIGS. 15 to 17.

The present embodiment is concerned with the foregoing second practical form.

An information processing apparatus of the present embodiment is constructed like FIG. 7.

Figure 15:
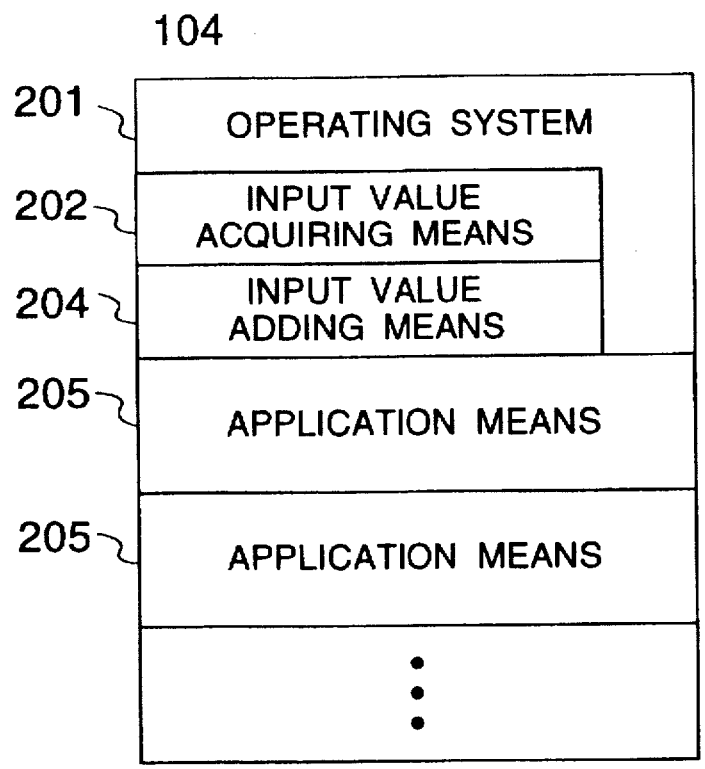
FIG. 15 is a diagram showing the structure of a memory in a second embodiment of the information processing apparatus.

The memory 104 is constructed as shown in FIG. 15.

In FIG. 15, reference numeral 201 designates an OS, 202 input value acquiring means, 204 allowable value adding means, and 205 application means.

Since in the present embodiment an allowable value a is determined by the application means 205, the allowable value determining means 203 in FIG. 8 is omitted.

While in the first embodiment the allowable value determining means 203 responds to the allowable value calculating method designating information F delivered out of the application means 205 to determine the allowable value a and hence the allowable value a is predetermined, the application means 205 in the present embodiment can determine, in accordance with the kind of parameter requiring an input value and conditions at that time, an allowable value a to be added to the input value of the parameter as a desired value.

Figure 16:
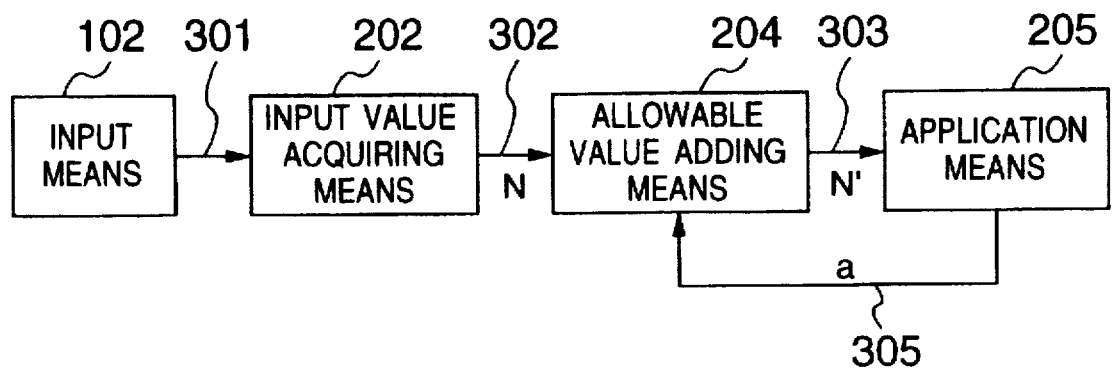
FIG. 16 is a block diagram for explaining operational relations between individual means in the second embodiment.

The individual means shown in FIG. 15 are related to each other in operation as shown in FIG. 16.

Referring to FIG. 16, a mouse is also used as the input means 102 in the present embodiment as in the case of the first embodiment.

Firstly, when the application means 205 requires an input value of a parameter, the input value acquiring means 202 acquires, as in the first embodiment, an input value N 302 in accordance with movement information/button depression information 301 of the mouse 102 delivered out of the mouse 102 as the mouse 102 is operated.

In accordance with the kind of parameter requiring the input value and conditions at that time, the application means 205 delivers an allowable value a 305 to be added to the input value of the parameter to the allowable value adding means 204. More specifically, when no allowable value is added, "0.0" is delivered as the allowable value a 305 but when the addition of allowable value is needed, a desired value is delivered as the allowable value a 305.

The contents of the allowable value a 305 may be determined fixedly in advance in accordance with each of the kinds of parameters and conditions but it may otherwise be supplied by the user to the application means 205 in advance in accordance with each of the kinds of parameters and conditions.

The allowable value adding means 204 determines an input value N' 303 delivered to the application means 205 by adding the allowable value a 305 delivered out of the application means 205 to the input value N 302 delivered out of the input value acquiring means 202 and delivers the thus determined input value N' 303 to the application means 205.

Figure 17:
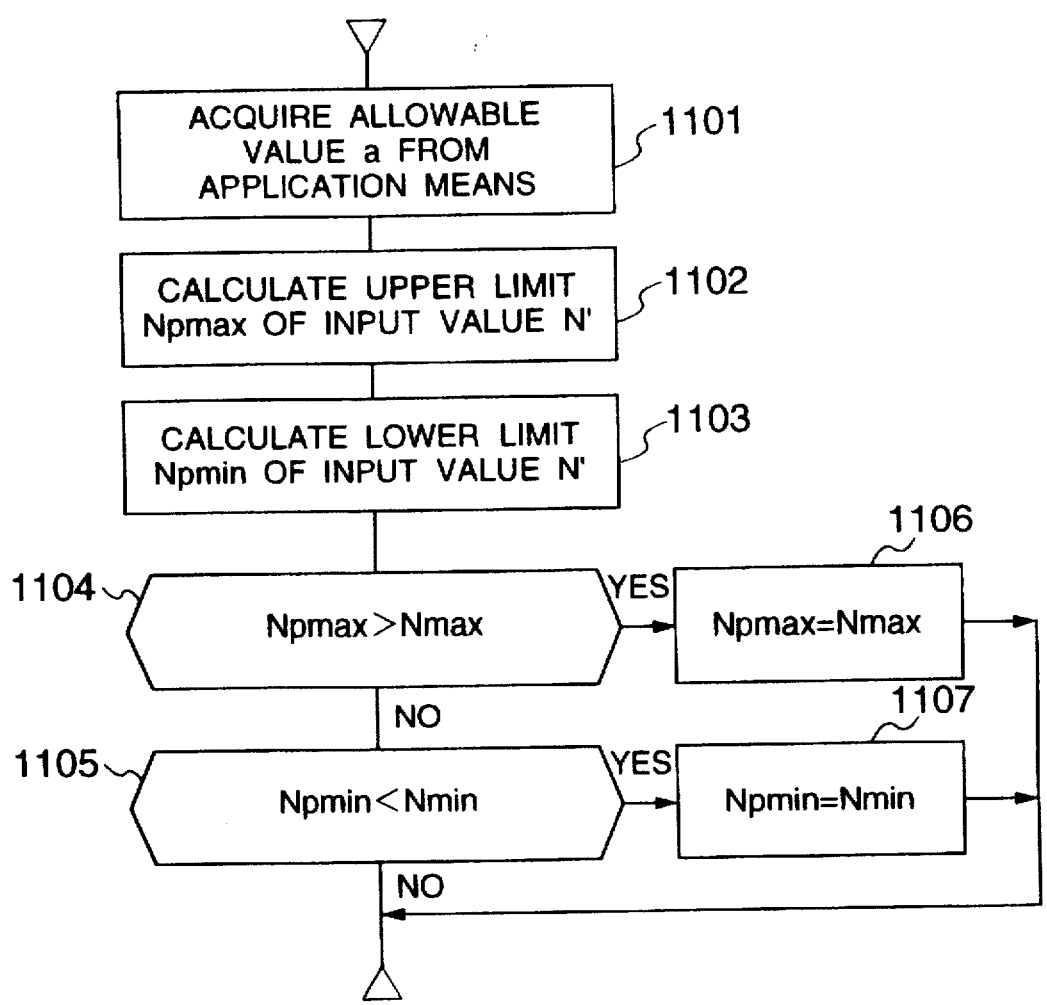
FIG. 17 is an operational flow chart of allowable value adding means in the second embodiment.

An operational flow chart of the allowable value adding means 204 is shown in FIG. 17.

The allowable value adding means 204 is a program arranged on the memory 104 and the operation shown in FIG. 17 is realized when the CPU 103 executes the program.

As shown in FIG. 17, the allowable value adding means 204 first acquires an allowable value a 305 delivered out of the application means 205 (step 1101).

Subsequently, an upper limit Npmax of an input value N' 303 to be delivered to the application means 205 is determined by adding the allowable value a 305 acquired in step 1101 to an input value N 302 delivered out of the input value acquiring means 202 (step 1102). Further, a lower limit Npmin of the input value N' 303 to be delivered to the application means 205 is determined by subtracting the allowable value a 305 acquired in step 1101 from the input value N302 delivered out of the input value acquiring means 202 (step 1103).

Subsequently, in steps 1104 to 1107, the range of upper limit Npmax or lower limit Npmin is checked and modified such that it does not exceed an absolute upper limit Nmax or absolute lower limit Nmin.

Accordingly, the contents of the input values N' 303 actually delivered to the application means 205 is the input value N 302, the upper limit Npmax or the lower limit Npmin.

Through the operation described above, in the present embodiment, too, the input value is allowed to have a large range by adding the allowable value to the set input value when the user operates the mouse 102 in accordance with the kind of parameter requiring the input value and conditions at that time, as in the case of the foregoing embodiment.

A third embodiment of the information processing apparatus will be described with reference to FIGS. 18 to 20.

The present embodiment is concerned with the foregoing first practical form and is directed to an embodiment in which allowable value learning means is additionally provided.

An information processing apparatus of the present embodiment is constructed like FIG. 7.

Figure 18:
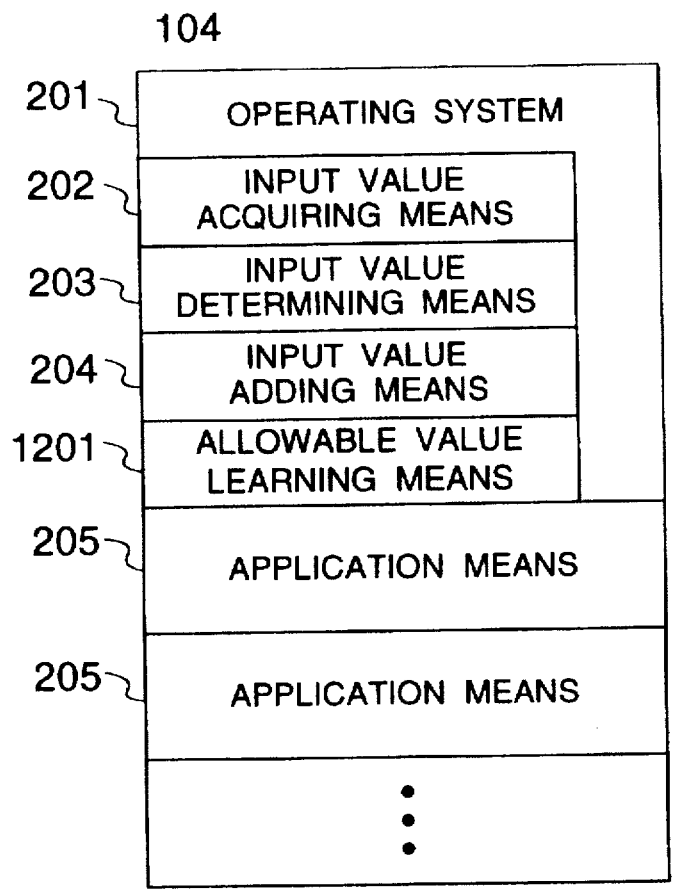
FIG. 18 is a diagram showing the structure of a memory in a third embodiment of the information processing apparatus.

The memory 104 is constructed as shown in FIG. 18.

In FIG. 18, reference numeral 201 designates an OS, 202 input value acquiring means, 203 allowable value determining means, 204 allowable value adding means, 205 application means and 1201 allowable value learning means.

In the present embodiment, there is provided the allowable value learning means 1201 for learning whether the user acknowledges the addition of an allowable value a to an input value N, and the allowable value determining means 203 modifies the allowable value a in accordance with a result of learning by the allowable value learning means 1201. The allowable value learning means 1201 is arranged as shown in FIG. 18.

Like the input value acquiring means 202, allowable value determining means 203 and allowable value adding means 204, the allowable value learning means 1201 constitutes part of the OS 201.

Figure 19:
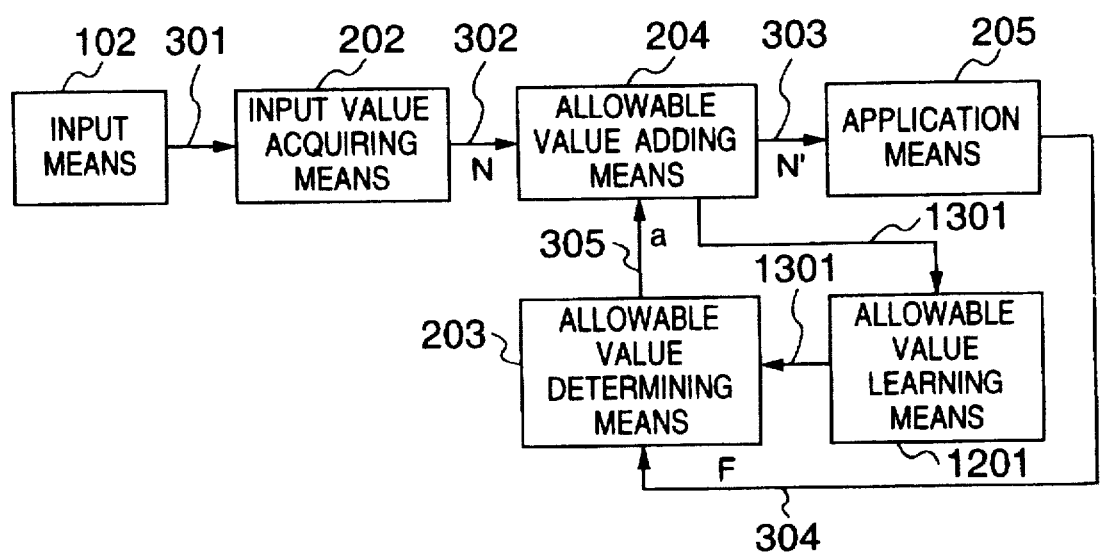
FIG. 19 is a block diagram showing operational relations between individual means in the third embodiment.

The individual means shown in FIG. 18 are related to each other in operation as shown in FIG. 19.

Referring to FIG. 19, a mouse is also used as the input means 102 in the present embodiment as in the case of the first embodiment.

Firstly, when the application means 205 requires an input value of a parameter, the input value acquiring means 202 acquires, as in the first embodiment, an input value N 302 in accordance with movement information/button depression information 301 of the mouse 102 as the mouse 102 is operated.

When information regarding whether an allowable value is added to the input value of the parameter and the allowable value are added in accordance with the kind of the parameter requiring the input value and a condition at that time, the application means 205 delivers to the allowable value determining means 203 the allowable value calculating method designating information F 304 in the form of information regarding what degree of allowable value is added.

The contents of the allowable value calculating method designating information F 304 may be determined fixedly in advance in accordance with each of the kinds of parameters and conditions but it may otherwise be supplied by the user to the application means 205 in advance in accordance with each of the kinds of parameters and conditions.

The allowable value determining means 203 responds to the contents of the allowable value calculating method designating information F 304 delivered out of the application means 205 to determine an allowable value a 305 to be added by the allowable value adding means 204 to the input value N 302 and delivers the thus determined allowable value a 305 to the allowable value adding means 204.

The allowable value adding means 204 determines an incus value N, 303 to be delivered to the application means 205 by adding the allowable value a 305 delivered out of the allowable value determining means 203 to the input value N 302 delivered out of the input value acquiring means 202 and delivers the thus determined input value N' 303 to the application means 205. In the present embodiment, the allowable value adding means 204 also delivers, to the allowable value learning means 1201, acknowledgment/ rejection information 1301 as to whether the user acknowledges the determined input value N' 303, that is, the user acknowledges the addition of the allowable value a 305 to the input value N 302.

The allowable value learning means 1201 stores, in accordance with each of the kinds of parameters whose input values N 302 are set by user's operation, pieces of the acknowledgment/rejection information 1301 delivered out of the allowable value adding means 204 and delivers the stored acknowledgment/rejection information 1301 to the allowable value determining means 203.

Thus, in the present embodiment, the allowable value determining means 203 modifies the determined allowable value a 305 in accordance with the acknowledgment/ rejection information 1301 delivered out of the allowable value learning means 1201 and delivers a modified allowable value to the allowable value adding means 204.

Figure 20:
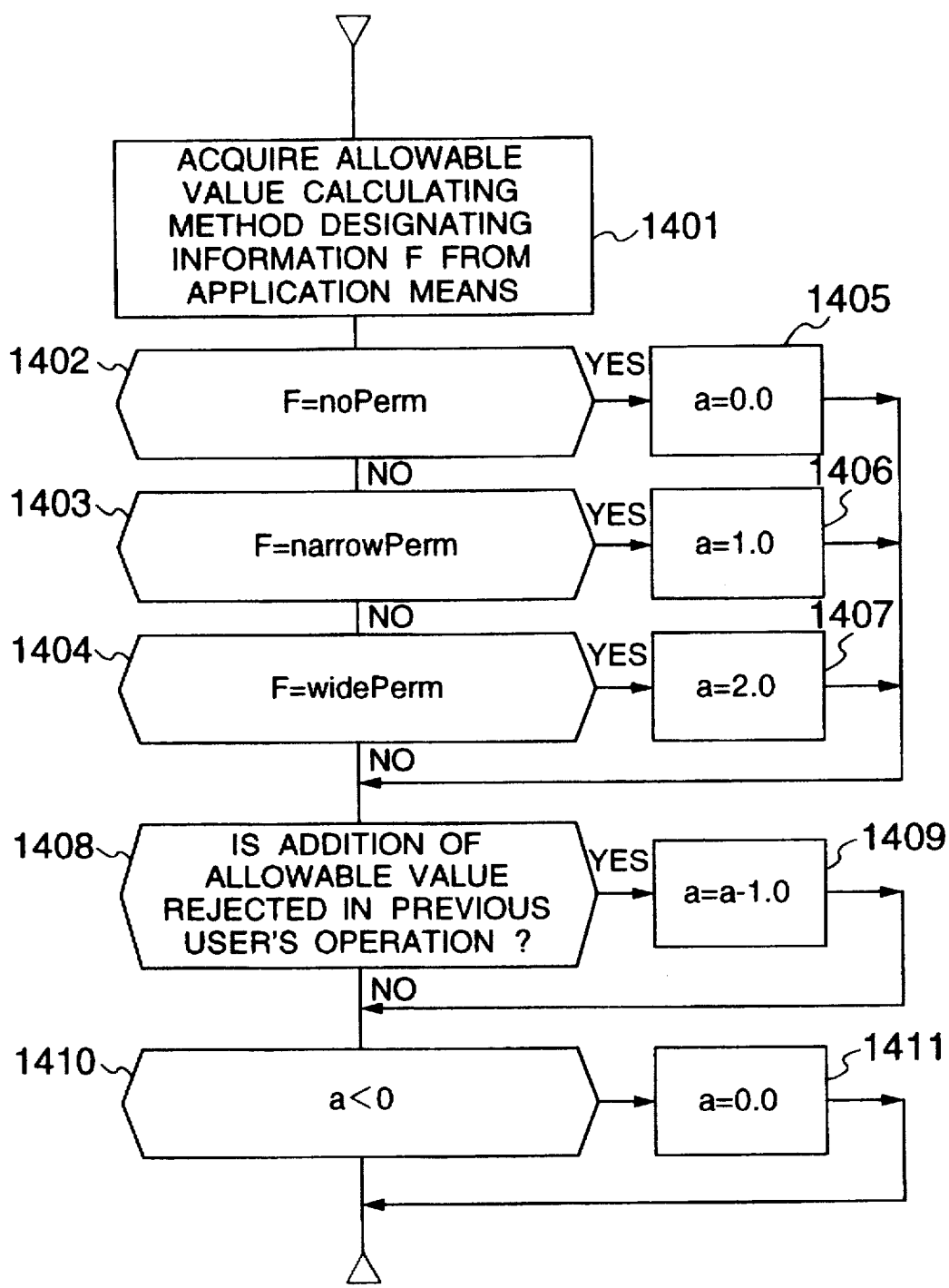
FIG. 20 is an operational flow chart of allowable value determining means in the third embodiment.

An operational flow chart of the allowable value determining means 203 is shown in FIG. 20.

The allowable value determining means 203 is a program arranged on the memory 104 and operation shown in FIG. 20 is realized when the CPU 103 executes the program.

As shown in FIG. 20, the allowable value determining means 203 acquires allowable value calculating method designating information F 304 delivered out of the application means 205 (step 1401).

Subsequently, in steps 1402 to 1404, the program branches in accordance with the contents of the allowable value calculating method designating information F 304 acquired in step 1401 and an allowable value a 305 is determined in accordance with each branching condition in step 1405, 1406 or 1407.

Like the foregoing first embodiment, three kinds of the contents of the allowable value calculating method designating information F 304 are also prepared in the present embodiment, including "noPerm" purporting that no allowable value is added, "narrowperm", purporting that an allowable value of level 1 is added and "wideperm" purporting that an allowable value of level 2 is added. The allowable value determining means 203 causes the allowable value a 305 to be determined as "0.0" (step 1405) when the allowable value calculating method designating information F 304 is "noPerm" (step 1402), causes the allowable value a 305 to be determined as "1.0" (step 1406) when the allowable value calculating method designating information F 304 is "narrowperm" (step 1403) and causes the allowable value a 305 to be determined as "2.0" (step 1407) when the allowable value calculating method designating information F 304 is "wideperm" (step 1404).

Subsequently, in steps 1408 to 1411, the allowable value determining means 203 modifies the determined allowable value a 305 in accordance with the acknowledgment/ rejection information 1301 delivered out of the allowable value learning means 1201 and then delivers a modified allowable value to the allowable value adding means 204.

The allowable value determining means 203 knows from the contents of the acknowledgment/rejection information 1301 delivered out of the allowable value learning means 1201 whether or not the user has acknowledged, in the previous user's operation, the addition of the allowable value a 305 to the input value N 302 in connection with the parameter needing the input value N' 303. If the user has rejected the addition of the allowable value a 305 to the input value N 302 in the previous user's operation (step 1408), the allowable value a 305 is modified by subtracting "1.0" from the determined allowable value a 305 (step 1409) and a modified allowable value a 305 is delivered to the allowable value adding means 204. But, if the modified allowable value a 305 is negative (step 1410), the allowable value a 305 is again modified to "0.0" (step 1411).

When in the example shown in FIG. 13 the user rejects the input value (=2) of "print speed" by designating and depressing the NG button 706 using the mouse 102 but sets an input value N 302 of "print speed" subsequently, the allowable value determining means 203 reflects a result of learning by the allowable value learning means 1201 to modify the determined allowable value a 305 to av=1.0– 1.0=0.0.

An operational flow chart of the allowable value adding means 204 is identical to that of FIG. 12 with only the exception that an operation of delivering the acknowledgment/rejection information 1301 regarding whether the user acknowledges the addition of the allowable value a 305 to the input value N 302 to the allowable value learning means 1201 is added.

Like the foregoing first embodiment, in the present embodiment, also, the input value can be allowed to have a large range through the above operation by adding the allowable value to the set input value when the user operates the mouse 102 in accordance with the kind of parameter needing the input value and conditions at that time and besides, according to the present embodiment, the allowable value to be added can be modified in accordance with whether the user has acknowledged, in the previous user's operation, that the input value includes the range.

While in the present embodiment the contents of learning by the allowable value learning means 1201 is represented by the acknowledgment/rejection information 1301 regarding whether the user acknowledges the addition of the allowable value a 305 to the input value N 302, another type of information such as the number of resetting operations upon rejection may also be utilized.

In the present embodiment, the allowable value learning means 1201 learns the acknowledgment/ rejection information 1301 in connection with the previous user's operation but acknowledgment/rejection information 1301 on user's past operations effected by a predetermined number or during a predetermined period may be learned.

A fourth embodiment of the information processing apparatus will be described with reference to FIGS. 21 to 23.

The present embodiment is concerned with the foregoing second practical form and is especially directed to an embodiment in which allowable value learning means and allowable value modifying means are additionally provided.

An information processing apparatus of the present embodiment is constructed like FIG. 7.

Figure 21:
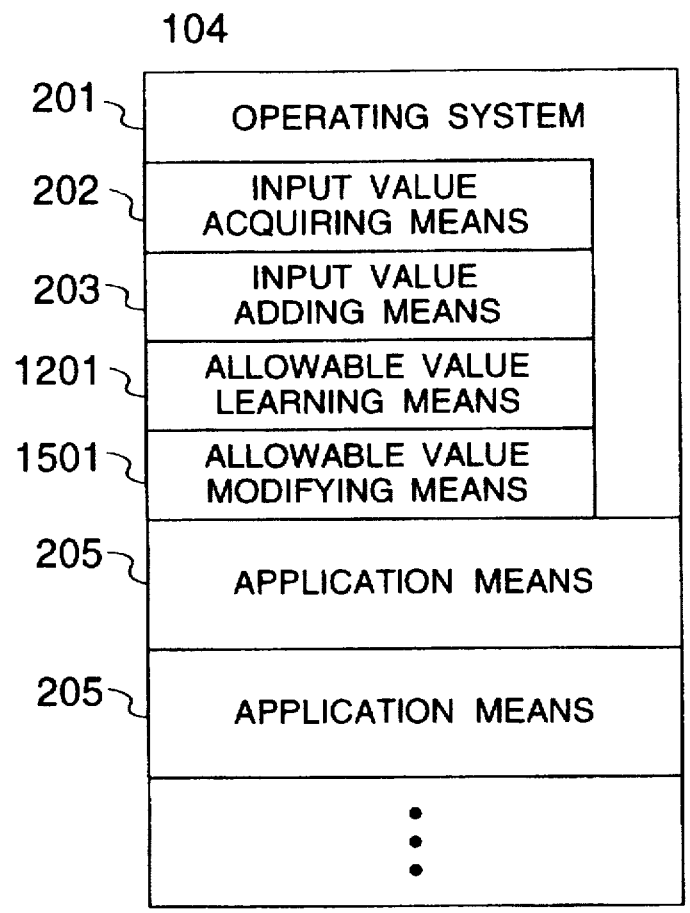
FIG. 21 is a diagram showing the structure of a memory in a fourth embodiment of the information processing apparatus.
Figure 22:
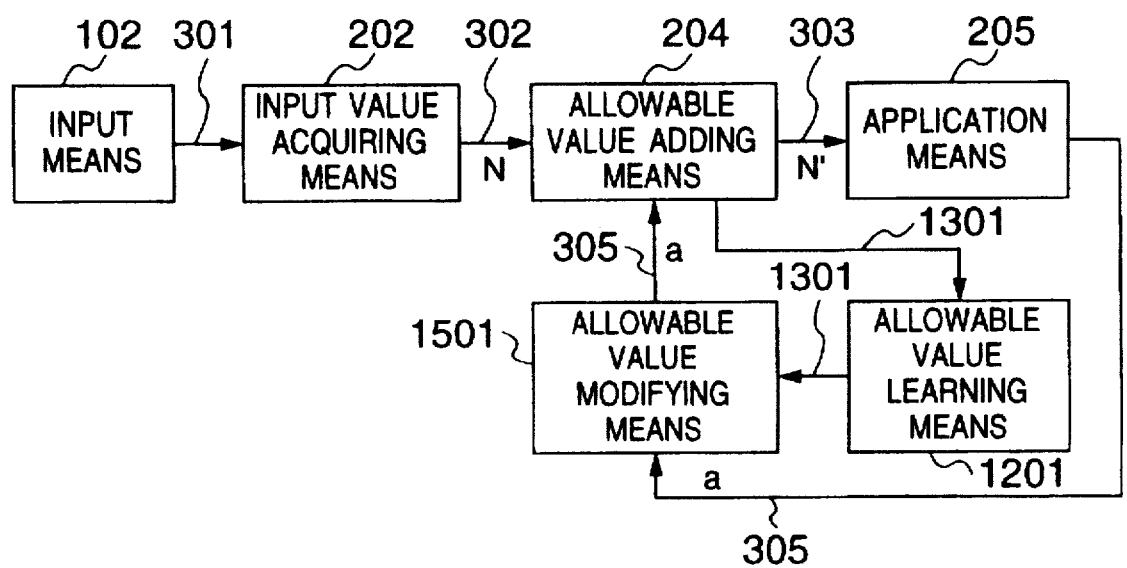
FIG. 22 is a block diagram for explaining operational relations between individual means in the fourth embodiment.

The memory 104 is constructed as shown in FIG. 21.

In FIG. 21, reference numeral 201 designates an OS, 202 input value acquiring means, 204 allowable value adding means, 205 application means, 1201 allowable value learning means and 1501 allowable value modifying means.

Like the third embodiment, in the present embodiment, the allowable value learning means 1201 learns whether the user acknowledges the addition of an allowable value a to an input value N and the allowable value adding means 204 responds to a result of learning by the allowable value learning means 1201 to modify the allowable value a. Accordingly, the allowable value learning means 1201 is arranged as shown in FIG. 21.

Further, like the second embodiment, in the present embodiment, the allowable value a is determined by the application means 205 and therefore, as shown in FIG. 21, the allowable value determining means 203 is not provided but the allowable value modifying means 1501 for modifying the allowable value a determined by the application means 205 is arranged. Accordingly, as in the second embodiment, the application means 205 can set the allowable value a to be added to the input value of the parameter to a desired value in accordance with the kind of the parameter needing the input value and conditions at that time.

Like the input value acquiring means 202 and allowable value adding means 204, the allowable value learning means 1201 and allowable value modifying means 1501 are part of the OS 201. Individual means shown in FIG. 21 are related to each other in operation as shown in FIG. 22. Referring to FIG. 22, a mouse is also used as the input means 102 in the present embodiment as in the first embodiment.

Firstly, when the application means 205 requires an input value of a parameter, the input value acquiring means 202 acquires, as in the first embodiment, an input value N 302 in accordance with movement information/button depression information 301 of the mouse 102 as the mouse 102 is operated.

In accordance with the kind of the parameter requiring the input value and conditions at that time, the application means 205 delivers an allowable value a 305 to be added to the input value of the parameter to the allowable value modifying means 1501. More particularly, when no allowable value is added, "0.0" is delivered as the allowable value a 305 but when the addition of allowable value is needed, a desired value is delivered as the allowable value a 305.

The contents of the allowable value a 305 may be determined fixedly in advance in accordance with each of the kinds of parameters and conditions but it may otherwise be supplied by the user to the application means 205 in advance in accordance with each of the kinds of parameters and conditions.

The allowable value modifying means 1501 responds to acknowledgment/rejection information 1301 delivered out of the allowable value learning means 1201 to modify the allowable value a 305 delivered out of the application means 205 and delivers a modified allowable value to the allowable value adding means 204.

The allowable value adding means 204 determines an input value N' 303 to be delivered to the application means 205 by adding the modified allowable value a 305 delivered out of the allowable value modifying means 1501 to the input value N 302 delivered out of the input acquiring means 202 and delivers the thus determined input value N, 303 to the application means 205. In the present embodiment, the allowable value adding means 204 also delivers, to the allowable value learning means 1201, acknowledgment/ rejection information 1301 regarding whether the user acknowledges the determined input value N, 303, that is, the user acknowledges the addition of the allowable value a 305 to the input value N 302.

The allowable value learning means 1201 stores, in accordance with each of the kinds of parameters for which input values N 302 are set by the user's operation, pieces of the acknowledgment/rejection information 1301 delivered out of the allowable value adding means 204 and delivers the stored acknowledgment/rejection information 1301 to the allowable value modifying means 1501.

Figure 23:
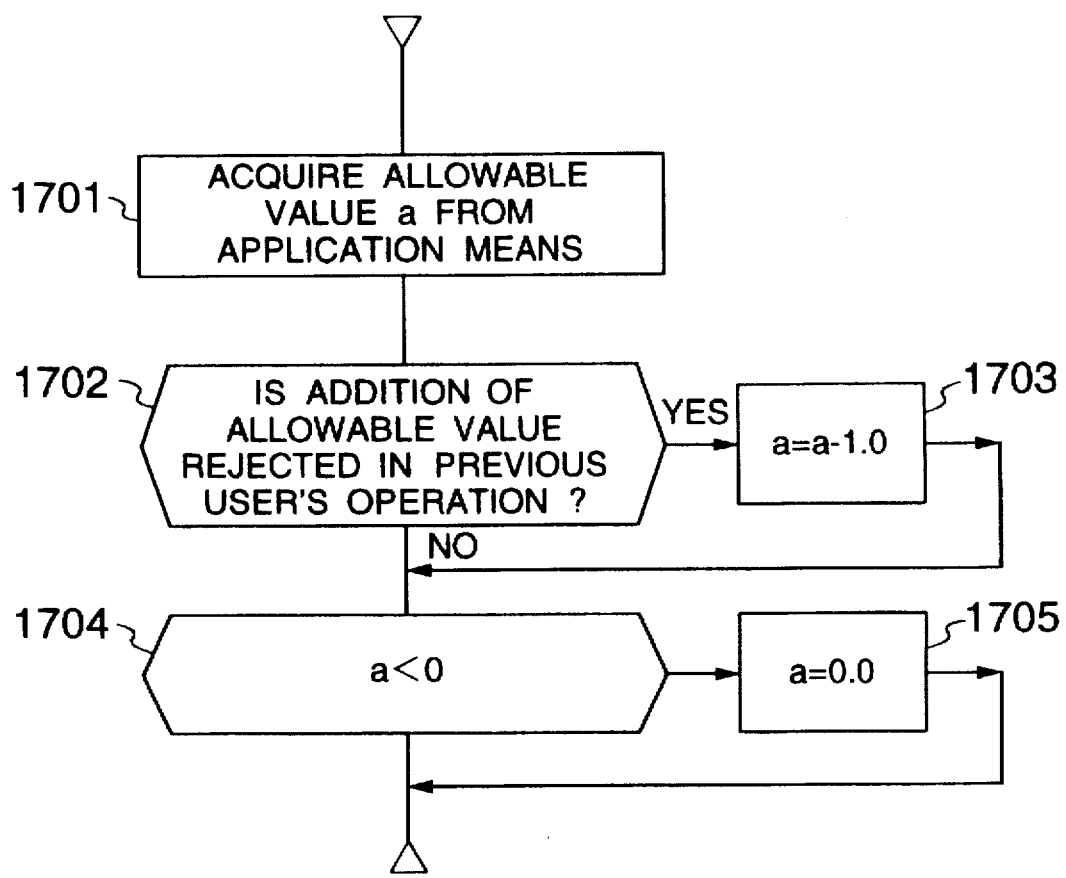
FIG. 23 is an operational flow chart of allowable value modifying means in the fourth embodiment.

An operational flow chart of the allowable value modifying means 1501 is shown in FIG. 23.

The allowable value modifying means 1501 is a program arranged on the memory 104 and the operation shown in FIG. 23 is realized when the CPU 103 executes that program.

As shown in FIG. 23, the allowable value modifying means 1501 first acquires an allowable value a 305 delivered out of the application means 205 (step 1701).

Subsequently, in steps 1702 to 1705, the allowable value modifying means 1501 responds to the acknowledgment/ rejection information 1301 delivered out of the allowable value learning means 1201 to modify the allowable value a 305 acquired in step 1701 and delivers a modified allowable value to the allowable value adding means 204.

The allowable value modifying means 1501 knows from the contents of the acknowledgment/rejection information 1301 delivered out of the allowable value learning means 1201 whether or not the user has acknowledged, in the previous user's operation, the addition of the allowable value a 305 to the input value N 302 in connection with the parameter requiring the input value N' 303. If the user has rejected the addition of the allowable value a 305 to the input value N 302 in the previous user's operation (step 1702), the allowable value a 305 is modified by subtracting "1.0" from the allowable value a 305 acquired in step 1701 (step 1703) and a modified allowable value a 305 is delivered to the allowable value adding means 204. But, if the modified allowable value a 305 is negative (step 1704), the allowable value a 305 is again modified to "0.0" (step 1705).

An operational flow chart of the allowable value adding means 204 is identical to that of FIG. 12 with the only exception being that an operation of delivering the acknowledgment/rejection information 1301 regarding whether the user acknowledges the addition of the allowable value a 305 to the input value N 302 to the allowable value learning means 1201.

Like the foregoing first embodiment, in the present embodiment, also, the input value can be allowed to have a large range through the above operation by adding the allowable value to the set input value when the user operates the mouse 102 in accordance with the kind of parameter requiring the input value and conditions at that time and besides, according to the present embodiment, the allowable value to be added can be modified in accordance with whether the user has acknowledged, in the previous user's operation, that the input value includes the range as in the case of the third embodiment.

A fifth embodiment of the information processing apparatus will be described with reference to FIG. 24.

The present embodiment is a modification of the first embodiment of FIGS. 7 to 14.

An information processing apparatus of the present embodiment is constructed like FIG. 7.

Figure 24:
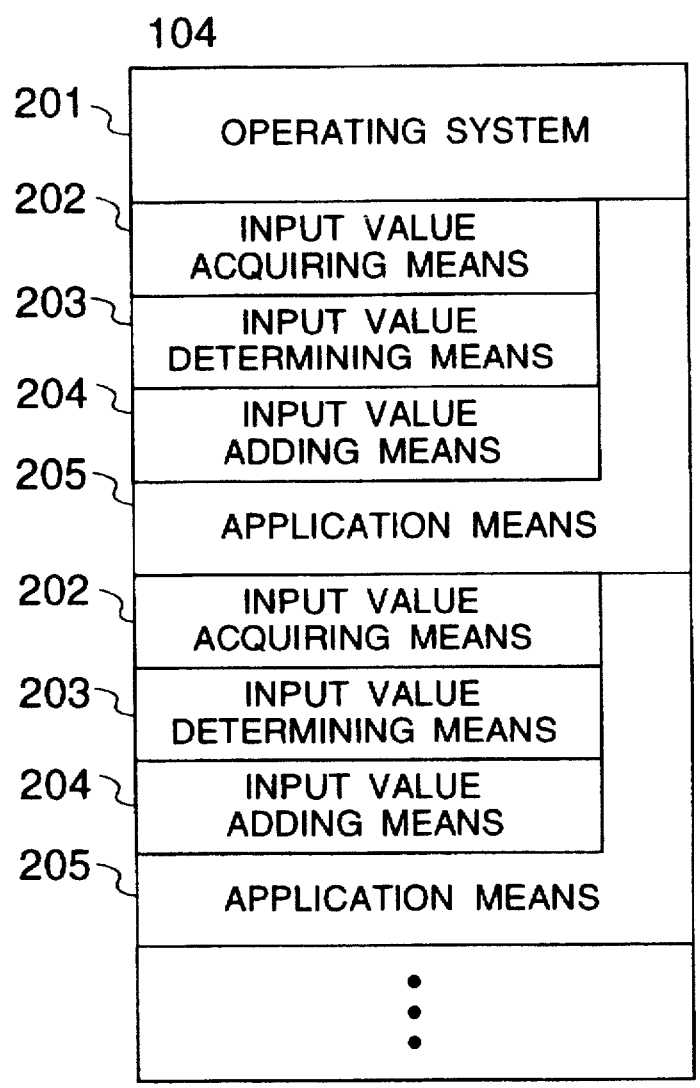
FIG. 24 is a diagram showing the structure of a memory in a fifth embodiment of the information processing apparatus.

The memory 104 is constructed as shown in FIG. 24.

In FIG. 24, reference numeral 201 designates an OS, 202 input value acquiring means, 203 allowable value determining means, 204 allowable value adding means and 205 application means.

While in the first embodiment of FIGS. 7 to 14 the input value acquiring means 202, allowable value determining means 203 and allowable value adding means 204 constitute part of the OS 201, the means 202, 203 and 204 constitute part of the application means 205 in the present embodiment. Accordingly, when the application means 205 is not executed, the means 202, 203 and 204 are not arranged on the memory 104, so that the utilization efficiency of the memory 104 can be improved.

Further, by providing the input value acquiring means 202, allowable value determining means 203 and allowable value adding means 204 in association with each of the application means 205, an allowable value a of high degree of freedom which is intimate to the processing realized by each application means 205 can be added to thereby improve the reliability thereof.

The operation of the input value acquiring means 202, allowable value determining means 203 and allowable value adding means 204 is similar to that in the first embodiment of FIGS. 7 to 14.

In the present embodiment, all of the input value acquiring means 202, allowable value determining means 203 and allowable value adding means 204 are included in the application means 205 but at least one of them may otherwise be included therein.

A sixth embodiment of the information processing apparatus will be described with reference to FIG. 25.

The present embodiment is a modification of the second embodiment.

An information processing apparatus of the present embodiment is constructed like FIG. 7.

Figure 25:
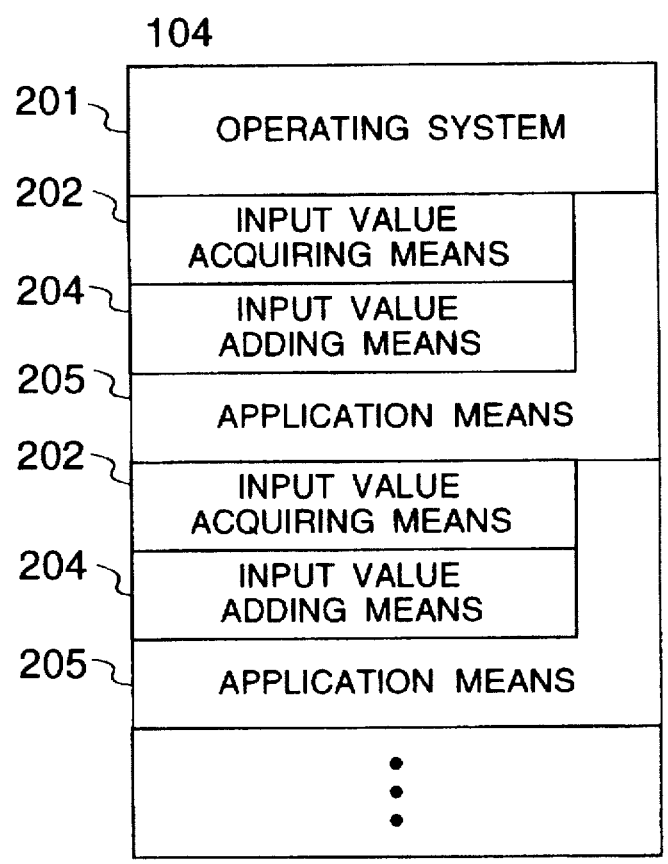
FIG. 25 is a diagram showing the structure of a memory in a sixth embodiment of the information processing apparatus.

The memory 104 is constructed as shown in FIG. 25.

In FIG. 25, reference numeral 201 designates an OS, 202 input value acquiring means, 204 allowable value adding means and 205 application means.

While in the second embodiment of FIGS. 15 to 17 the input value acquiring means 202 and allowable value adding means 204 are part of the OS 201, the means 202 and 204 are part of the application means 205 in the present embodiment. Accordingly, when the application means 205 is not executed, the means 202 and 204 are not arranged on the memory 104, so that the utilization efficiency of the memory 104 can be improved.

Further, by providing the input value acquiring means 202 and allowable value adding means 204 in association with each of the application means 205, an allowable value a of high degree of freedom which is intimate to the processing realized by each application means 205 can be added to thereby improve the reliability thereof.

The operation of the input value acquiring means 202 and allowable value adding means 204 is similar to that in the second embodiment.

In the present embodiment, both of the input value acquiring means 202 and the allowable value adding means 204 are included in the application means 205 but at least one of them may otherwise be included therein.

A seventh embodiment of the information processing apparatus will now be described with reference to FIGS. 26 to 30.

The present embodiment is concerned with the third practical form.

An information processing apparatus of the present embodiment is constructed like FIG. 7.

Figure 26:
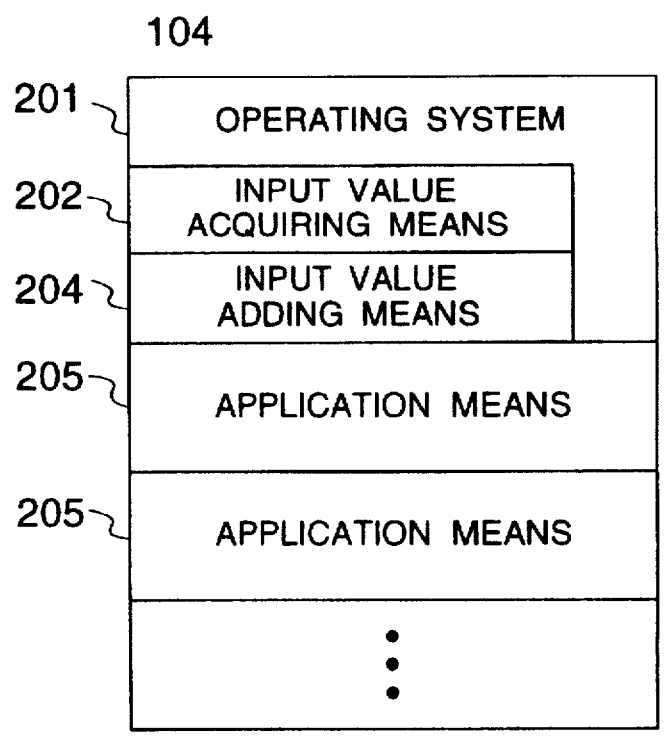
FIG. 26 is a diagram showing the structure of a memory in a seventh embodiment of the information processing apparatus.

The memory 104 is constructed as shown in FIG. 26.

In FIG. 26, reference numeral 201 designates an OS, 202 input value acquiring means, 204 allowable value adding means and 205 application means.

In the present embodiment, the user can set an allowable value a to be added to an input value N concurrently with setting of the input value N and can directly set an upper limit Npmax and a lower limit Npmin which result from the addition of the allowable value a to the input value N. Therefore, the allowable value determining means 203 is omitted in FIG. 26.

Figure 27:
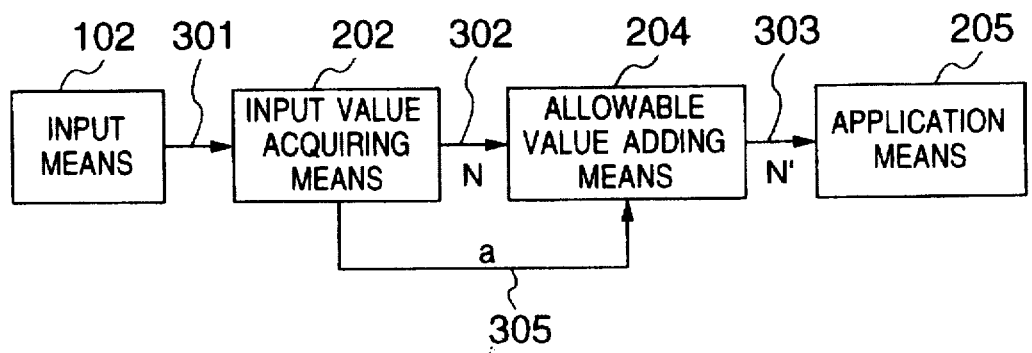
FIG. 27 is a block diagram showing operational relations between individual means in the seventh embodiment.

Individual means shown in FIG. 26 are related to each other in operation as shown in FIG. 27.

Referring to FIG. 27, a mouse is also used as the input means 102 in the present embodiment as in the case of the first embodiment.

Firstly, when the application means 205 requires an input value of a parameter, the input value acquiring means 202 acquires, as in the first embodiment, an input value N 302 in accordance with movement information/button depression information 301 of the mouse 102 as the mouse 102 is operated. In the present embodiment, the input value acquiring means 202 also acquires an allowable value a 305 in accordance with the movement information/button depression information 301 of the mouse 102 as the mouse 102 is operated.

The allowable value adding means 204 determines an input value N' 303 delivered to the application means 205 by adding the allowable value a 305 delivered out of the input value acquiring means 202 to the input value N 302 delivered out of the input value acquiring means 202 and delivers the thus determined input value N' 303 to the application means 205.

An operational flow chart of the allowable value adding means 204 is identical to that in FIG. 12 with the exception that when upper limit Npmax and lower limit Npmin are set directly by the user, the allowable value adding means 204 delivers to the application means 205 the input value N 302, upper limit Npmax and lower limit Npmin as they are in the form of the input value N' 303.

Operation when the user sets the input value N and allowable value a will be described with reference to FIGS. 28 to 30.

Figure 28:
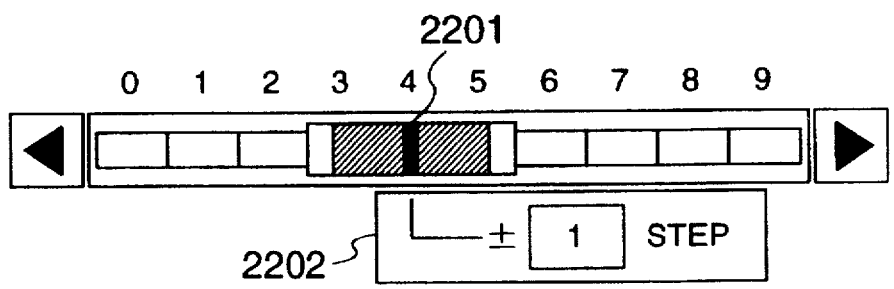
FIGS. 28–30 are diagrams showing examples of input value setting screens in the seventh embodiment.

When the application means 205 requires an input value of a parameter, the input value acquiring means 202 causes the display means 105 to display an input value setting screen as shown in FIG. 28.

In the input value setting screen shown in FIG. 28, the user can set a desired input value N (here "4") by designating a knob 2201 by clicking the mouse 102 and besides, can set an allowable value a 305 (here "1") to be added to the input value N by means of a dialogue box 2202 as necessary. Since in this case the allowable value a to be set is of one kind, a difference between input value N and upper limit Npmax and a difference between input value N and lower limit Npmin both correspond to the allowable value a set by the user but when an allowable value a representing the difference between input value N and lower limit Npmin and another allowable value a representing the difference between input value N and upper limit Npmax are set independently, both the differences can be of different values.

When the user sets the allowable value a, it is preferable that the user know upper limit Npmax and lower limit Npmin resulting from the addition of the allowable value a to the input value N and in FIG. 28, both sides of the knob 2201 being extendible to the right and left until upper limit Npmax (=4+1=5) and lower limit Npmin (=4−1=3).

Figure 29:
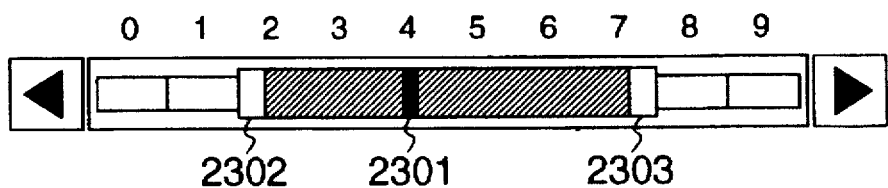

When the application means 205 requires an input value of a parameter, the input value acquiring means 202 causes the display means 105 to display, for example, an input value setting screen as shown in FIG. 29.

In the input value setting screen shown in FIG. 29, the user can set a desired input value N (here "4") by designating a knob 2301 by clicking the mouse 102 and besides, can directly set an upper limit Npmax (here "7") and a lower limit Npmin (here "2") as necessary by dragging both sides 2302 and 2303 4 of the knob 2301 to desired scales by means of the mouse 102. In this case, it is not always necessary that the difference between input value N and lower limit Npmin be equal to the difference between input value N and upper limit Npmax.

Figure 30:
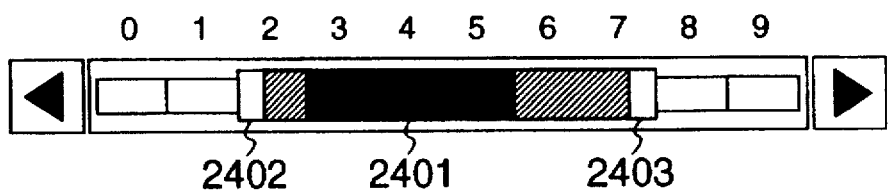

When the application means 205 requires an input value of a parameter, the input value acquiring means 202 causes the display means 105 to display, for example, an input value setting screen as shown in FIG. 30. Illustrated in FIG. 30 is an example of the input value setting screen when an input value N indicative of a range of time zone is set.

In the input value setting screen shown in FIG. 30, the user can set a desired range of input value N (here "3" to "5") by designating a knob 2401 by clicking the mouse 102 and besides, can directly set an upper limit Npmax (here "7") and a lower limit Npmin (here "2") as necessary by dragging both sides 2402 and 2403 of the knob 2401 to the desired scales by means of the mouse 102. In this case, also, it is not always necessary that the difference between input value N and lower limit Npmin be equal to the difference between input N and upper limit Npmax.

As described above, according to the present embodiment, the user can set an allowable value a to be added to an input value N concurrently with setting of the input value N and can directly set an upper limit Npmax and a lower limit Npmin which result from the addition of the allowable value a to the input value N, so that the efficiency of transmission of user's setting intention to the application means 205 can be improved.

An input value setting screen of a different configuration from those of the input value setting screens shown in FIGS. 28 to 30 may be used and the input value may be set by using another type of input means 102.

Alternatively, the present embodiment may be combined with any one of the foregoing embodiments, whereby a configuration can be ensured in which selection and switching can be effected between a case where the input value N' is determined by adding the allowable value a set by the user and a case where the input value N' is determined by adding the allowable value a determined by the information processing apparatus 101, or a configuration can be ensured in which when the user does not set the allowable value a, the input value N' is determined by adding the allowable value a determined by the information processing apparatus 101.

Incidentally, the seventh embodiment can also be applied to a case where the input value N set by the user is a menu item in a menu selecting screen and an eighth embodiment to this effect will be described with reference to FIGS. 31 and 32.

Figure 31:
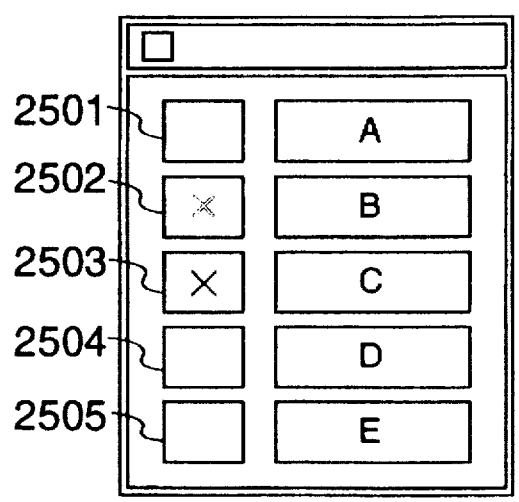
FIGS. 31 and 32 are diagrams for explaining examples of input value setting screens in an eighth embodiment of the information processing apparatus.

When the application means 205 requires an input value (a menu item) of a parameter, the input value acquiring means 202 causes the display unit 105 to display, for example, a menu selection screen as shown in FIG. 31.

In the menu selection screen shown in FIG. 31, the user can select a desired menu item (here "C") by designating a check box 2503 of the desired menu item among check boxes 2501 to 2505 of menu items A to E by means of the mouse 102 and clicking the button of the mouse 102. At that time, "X" is indicated at the check box 2503 of the selected menu item C to make the selection known.

Further, the user can select as necessary a different menu item (here "B") by designating the check box 2502 of the different menu item by means of the mouse 102 and depressing twice (double clicking) the button of the mouse 102. At that time, "X" of a changed display form is indicated at the check box 2502 of the selected menu item B to make the selection known.

By handling the menu item C selected when the user carries out designation and clicking the mouse 102 as the input value N in the seventh embodiment and by handling the menu item B selected when the user carries out designation and double clicking the mouse 102 as the upper limit Npmax and lower limit Npmin in the seventh embodiment, the present embodiment can be applied to the foregoing seventh embodiment.

In other words, the user can select a desired menu item and at the same time can also select a different menu item in expectation of the selected menu item being inappropriate.

The manner of selecting the different menu item is not limited to that exemplified as above.

Figure 32:
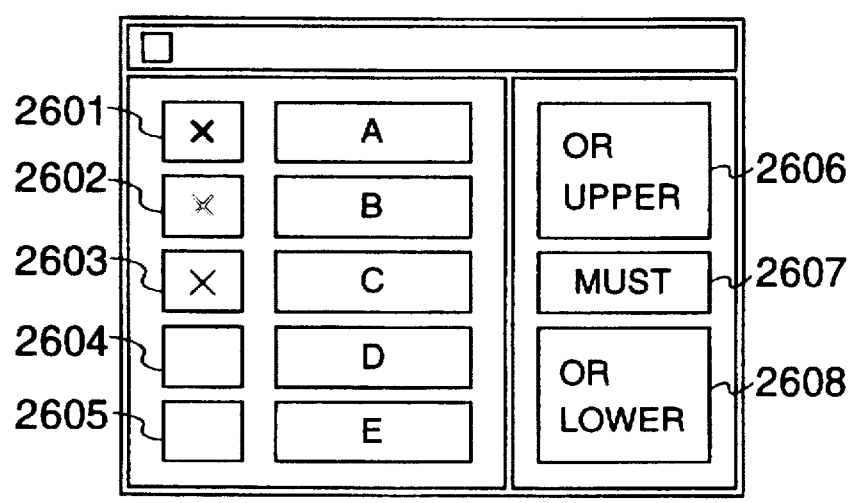

When the application means 205 requires an input value (menu item) of a parameter, the input value acquiring means 202 causes the display means 105 to display, for example, a menu selecting screen as shown in FIG. 32.

In the menu selecting screen shown in FIG. 32, the user can select a desired menu item (here "C") by designating a check box 2603 of the desired menu item among check boxes 2601 to 2605 of menu items A to E by means of the mouse 102 and clicking the mouse 102. At that time, "X" is indicated at the check box 2603 of the selected menu item C to make the selection known.

Further, the user can select as necessary different menu items by designating a button 2606 or 2608 by means of the mouse 102 and clicking the mouse 102. More particularly, menu items A and B whose indication outranks that of the menu item C can be selected by designating and depressing the button 2606 and menu items D and E whose indication is subordinated to that of the menu item C can be selected by designating and depressing the button 2608.

Illustrated in FIG. 32 is an example in which the button 2606 is designated and depressed. At that time, "X" of a changed display form is indicated at the check boxes 2601 and 2602 of the selected menu items A and B to make the selection known.

When the user does not accept other menu items than the selected menu items, the button 2607 is designated and depressed.

By handling the menu item C selected when the user carries out designation and clicking using the mouse 102 as the input value N in the seventh embodiment and by handling the menu items A and B selected when the user designates and depresses the button 2606 or the menu items D and E selected when the user designates and depresses the button 2608 as the upper limit Npmax and lower limit Npmin in the seventh embodiment, the present embodiment can be applied to the seventh embodiment.

In other words, the user can select a desired menu item and at the same time can also select different menu items in expectation of the selected menu item being inappropriate. The user can also address an intention that the user does not accept menu items other than the selected menu item.

A menu selecting screen of a different configuration from those of the menu selecting screens shown in FIGS. 31 and 32 may be used and the menu item may be set by another type of input means 102.

A ninth embodiment of the information processing apparatus will be described with reference to FIGS. 33A and 33B.

The present embodiment is concerned with the third practical form of FIGS. 18 to 20 and is especially directed to an embodiment in which the processing means handles the input value acquired by the input value acquiring means in preference to the input value determined by the allowable value adding means.

An information processing apparatus of the present embodiment is constructed like FIG. 7.

The memory 104 is constructed like FIG. 26 and individual means are related to each other in operation like FIG. 27.

The present embodiment is an example in which in connection with the input value N' delivered to the application means 205, the input value N is handled distinctively from other input values (an upper limit Npmax, an input value between input value N and upper limit Npmax, a lower limit Npmin and an input value between input value N and lower limit Npmin) and these input values are weighted.

Figure 33A:
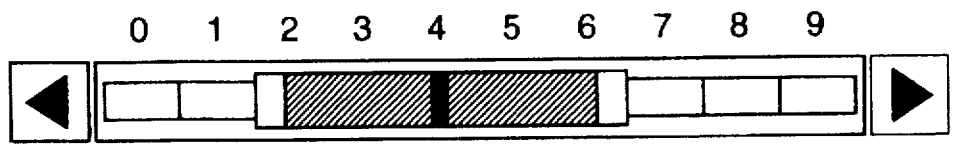
FIGS. 33A and 33B are diagrams for explaining examples of input value setting screens and weighting in a ninth embodiment of the information processing apparatus.

For example, given that in the input value setting screen an input value N of "4" is set by the user and upper limit Npmax and lower limit Npmin resulting from addition of an allowable value a set by the user to the input value N (or upper limit Npmax and lower limit Npmin directly set by the user) are "6" and "2", respectively, as shown in FIG. 33A, the allowable value adding means 204 delivers an input value N' including these values to the application means 205 as described hereinbefore.

Figure 33B:
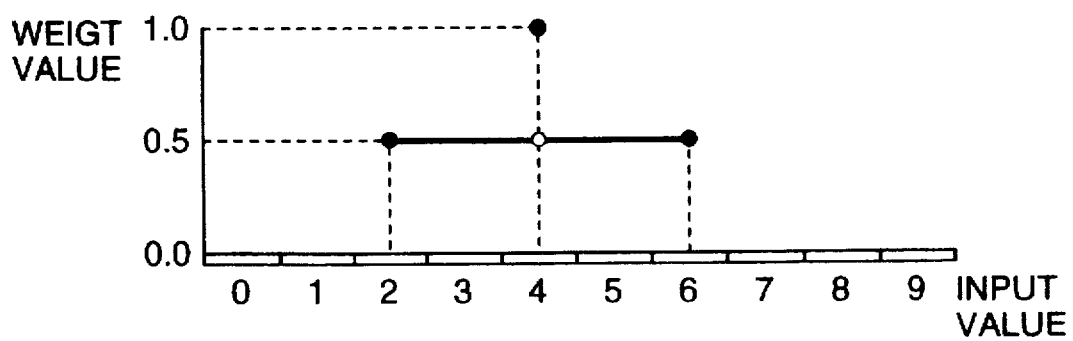

When the input value N' is delivered out of the allowable value adding means 204, the application means 205 allots a weight value G (here "1.0") representative of maximum weighting to, for example, an input value N (=4) of the input value N' as shown in FIG. 33B. Further, of the input value N', an upper limit Npmax (=6), an input value (=5) between the input value N and the upper limit Npmax, a lower limit Npmin (=2) and an input value (=3) between the input value N and the lower limit Npmin, respectively, are uniformly allotted with a predetermined weight value G (here "0.5") smaller than the weight value G allotted to the input value N.

Through this, when deciding whether the input value N' delivered out of the allowable value adding means 204 is proper, the application means 205 can handle the input value N set by the user in preference to other input values (an upper limit Npmax, an input value between the input value N and the upper limit Npmax, a lower limit Npmin and an input value between the input value N and the lower limit Npmin).

A specific example in which the application means 205 decides whether the input value N' is proper will now be described by considering when the input value N' delivered out of the allowable value adding means 204 is an input value of the previously-described parameter "print speed", for instance.

It is assumed herein that the input value N' of the parameter "print quality" includes an input value N, an upper limit Npmax and a lower limit Npmin which are all "7".

When the input values of the "print speed" and "print quality" are so correlated as to stand under the constraint condition shown in FIG. 14, the application means 205 knows that a "print speed" meeting the constraint condition when a "print quality" is "7" is "2" because an input value N' concerning the "print quality" includes an input value N, an upper limit Npmax and a lower limit Npmin which are all "7". Further, the application means 205 knows that the constraint condition is not held for the "print quality" being "7" when the input value N actually set by the user being "4" but the constraint condition is held by a lower limit Npmin=2 when the "print quality" is "7" because the input value N' concerning the "print speed" includes an input value N=4, an upper limit Npmax=6 and a lower limit Npmin=2.

In the present embodiment, however, a weight value G (here "0.3") necessary for holding the constraint condition shown in FIG. 14 is determined.

Here, a weight value G allotted to an input value of "print speed" of "2" which holds the constraint condition when the "print quality" is "7" is "0.5(>0.3) and is sufficient for holding the constraint condition shown in FIG. 14. Therefore, given that the "print quality" is "7 and the "print speed" is "2", the application means 205 is allowed to acquire a proper input value through one operation by the user.

Next, a tenth embodiment of the information processing apparatus will be described with reference to FIGS. 34 to 38.

The present embodiment is concerned with the third practical form and is especially directed to an embodiment in which the input value acquiring means acquires a weight value set by the user.

An information processing apparatus of the present embodiment is constructed like FIG. 7.

The memory 104 is constructed like FIG. 26.

Like the ninth embodiment, the present embodiment is also an example in which, in connection with the input value N' delivered out of the application means 205, the input value N is handled distinctively from other input values (an upper limit Npmax, an input value between input value N and upper limit Npmax, a lower limit Npmin and an input value between input value N and lower limit Npmin) and these input values are weighted. The user can set a weight value G.

Figure 34:
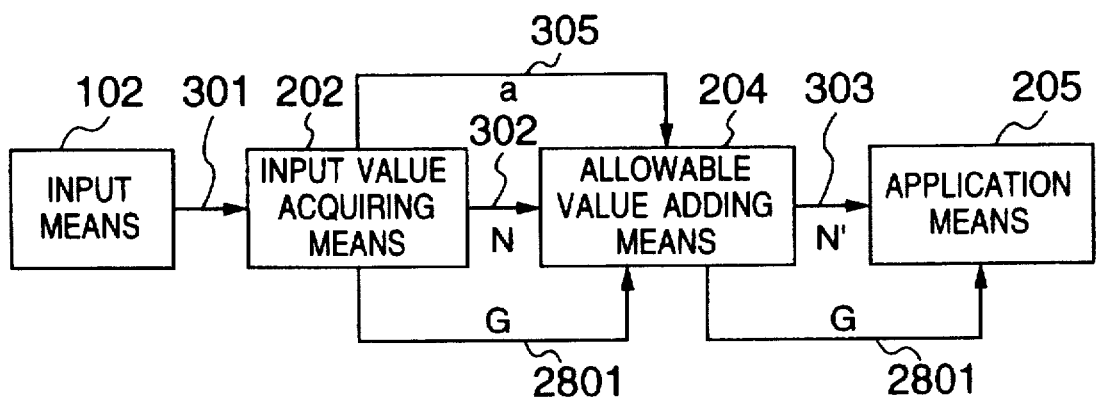
FIG. 34 is a block diagram for explaining operational relation between individual means in a tenth embodiment of the information processing apparatus.

Individual means shown in FIG. 20 are related to each other in operation as shown in FIG. 34.

Referring to FIG. 34, a mouse is also used as the input means 102 in the present embodiment as in the case of the first embodiment of FIGS. 7 to 14.

Firstly, when the application means 205 requires an input value of a parameter, the input value acquiring means 202 acquires, as in the first embodiment, an input value N 302 in accordance with movement information/button depression information 301 of the mouse 102 delivered out of the mouse 102 as the mouse 102 is operated. The input value acquiring means 202 also acquires an allowable value a 305 in accordance with the movement information/button depression information 301 of the mouse 102 delivered therefrom as the mouse 102 is operated. In the present embodiment, the input value acquiring means 202 acquires a weight value G 2801 as well in accordance with the movement information/button depression information 301 of the mouse 102 delivered therefrom as the mouse 102 is operated.

The allowable value adding means 204 determines an input value N' 303 delivered to the application means 205 by adding the allowable value a 305 delivered out of the input value acquiring means 202 to the input value N 302 delivered out of the input value acquiring means 202 and delivers the thus determined input value N, 303 to the application means 205. The allowable value adding means 204 also delivers to the application means 205 the weight value G 2801 delivered out of the input value acquiring means 202.

An operational flow chart of the allowable value adding means 204 is identical to that in FIG. 12 with the exception that an operation of delivering the weight value G 2801 delivered out of the input value acquiring means 202 to the application means 205. Further, when the user directly sets an upper limit Npmax and a lower limit Npmin as described in connection with the seventh embodiment, the allowable value adding means 204 delivers to the application means 205 the input value N 302, upper limit Npmax and lower limit Npmin as they are in the form of the input value N' 303.

Operation of setting of the weight value G by the user will now be described with reference to FIGS. 35A and 35B.

Figure 35A:
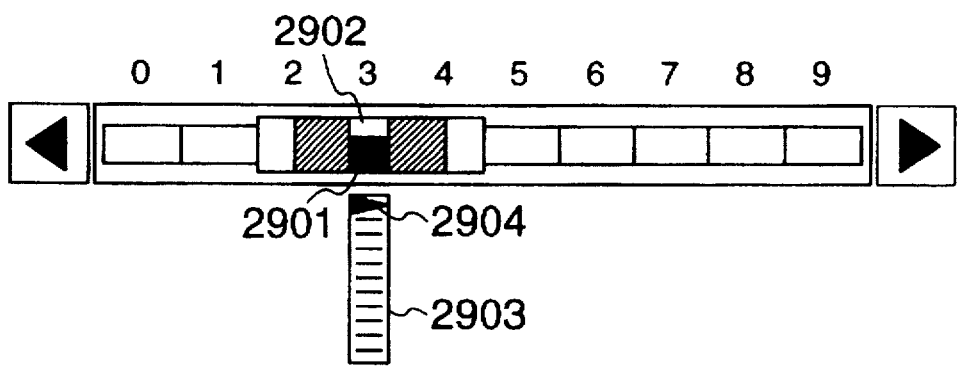
FIGS. 35A, 35B, 36A, and 36B are diagrams for explaining examples of input value setting screens and weighting in the tenth embodiment.

When the application means 205 requires an input value of a parameter, the input value acquiring means 202 causes the display means 105 to display, for example, an input value setting screen as shown in FIG. 35A.

In the input value setting screen shown in FIG. 35A, the user can set an input value N and an allowable value a (or an upper limit Npmax and a lower limit Npmin) through operation which has already been described in connection with the seventh embodiment.

In the example of FIG. 35A, the input value N, upper limit Npmax and lower limit Npmin are "3", "4" and "2" and the allowable value adding means 204 delivers to the application means 205 an input value N' including these values.

When the user designates and depresses a specified area 2902 above a knob 2901 by using the mouse 102 in the input value setting screen shown in FIG. 35A, the input value acquiring means 202 causes the display means 105 to display a weight value setting area 2903 for setting weight value G Then, the user can set a weight value G by dragging a triangular indicator item 2904 up and down by using the mouse 102 in the weight value setting area 2903.

Figure 35B:
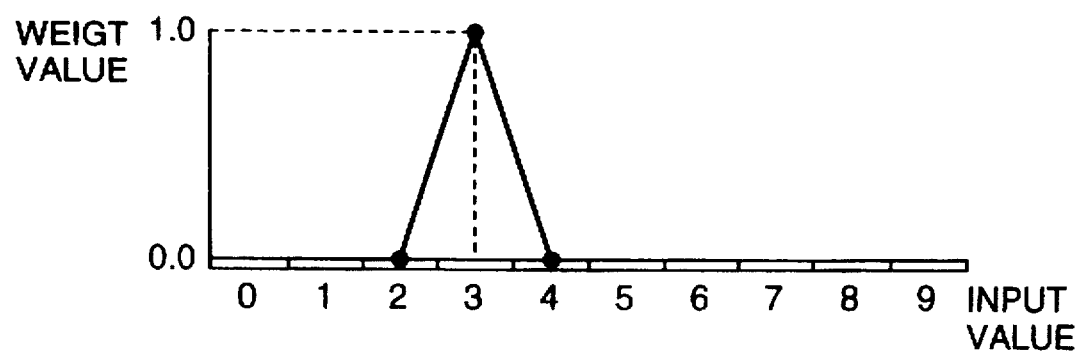

More specifically, the user can set the maximum value of weight value G to a desired one of "0.0" to "1.0" and as shown in FIG. 35B, a maximum value of weight value G set by the user (here "1.0") is allotted to an input value N (=3). Then, an upper limit Npmax (=4) and a lower limit Npmin (=2) are each allotted with a weight value G of "0.0".

In this example, no input value exists between the input value N and the upper limit Npmax and between the input value N and the lower limit Npmin but in the presence of input values, instead of the weight value G, the value allotted to the input value N is connected with weight values G (=0.0) allotted to the upper limit Npmax and lower limit Npmin through straight lines and a value on each straight line at corresponding coordinates of an input value is allotted thereto.

Alternatively, the contents as shown in FIG. 35B may be displayed on the display means 105 to make the state of weighting known to the user.

These weight values G are determined by the input value acquiring means 202 and delivered to the application means 205 through the allowable value adding means 204.

Through this, when deciding whether the input value N' delivered out of the allowable value adding means 204 is proper, the application means 205 can handle the input value N set by the user in preference to other input values (an upper limit Npmax, an input value between the input value N and the upper limit Npmax, a lower limit Npmin and an input value between the input value N and the lower limit Npmin).

Here, a specific example in which the application means 205 decides whether the input value N' is proper will be described by considering when the input value N' delivered out of the allowable value adding means 204 is an input value of the previously described parameter "print speed", for instance.

It is assumed that an input value N' of the parameter "print quality" includes an input value N, an upper limit Npmax and a lower limit Npmin which are all "7".

Figure 37:
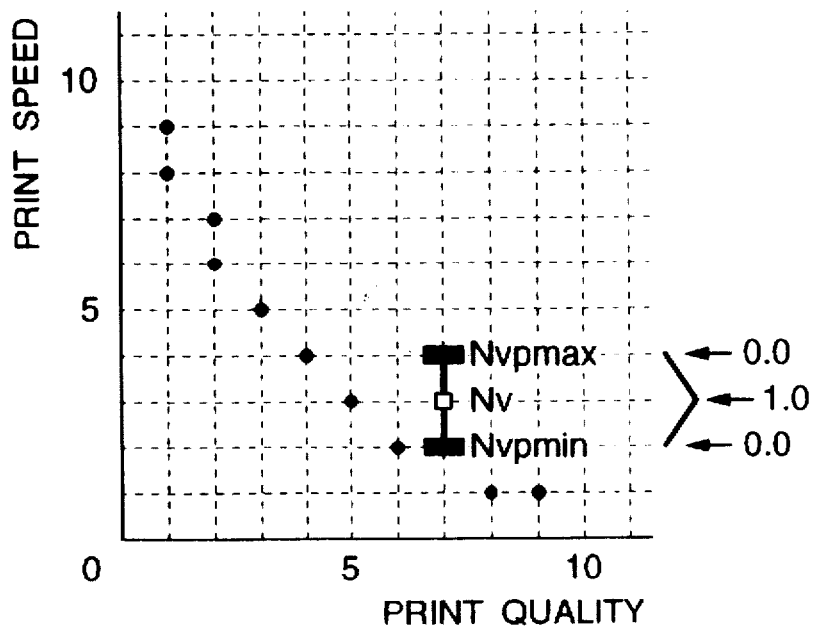
FIGS. 37 and 38 are graphic representations showing examples of constraint conditions under which pertinency between input values of parameters correlated to each other is maintained in the tenth embodiment.

When the input values of the "print speed" and "print quality" are so correlated as to stand under the constraint condition shown in FIG. 37, like the constraint condition shown in FIG. 14, the application means 205 knows that a "print speed" meeting the constraint condition when a "print quality" is "7" is "2" because the input value N' concerning the "print quality" includes an input value N, an upper limit Npmax and a lower limit Npmin which are all "7". Further, the application means 205 knows that the constraint condition is not held for the "print quality" being "7" when the input value Nv actually set by the user is "3" but the constraint condition is held by a lower limit Nvmin=2 for the "print quality" being "7" because an input value N' concerning the "print speed" includes an input value Nv=3, an upper limit Nvpmax=4 and a lower limit Nvpmin=2.

In the present embodiment, however, a weight value G (here "0.3") necessary for holding the constraint condition shown in FIG. 37 is also determined.

Here, since a weight value G allotted to the input value "2" of "print speed" which holds the constraint condition when the "print quality" is "7" is "0.0 (<0.3), the constraint condition shown in FIG. 37 is not held and the application means 205 cannot acquire a proper input value.

Figure 36A:
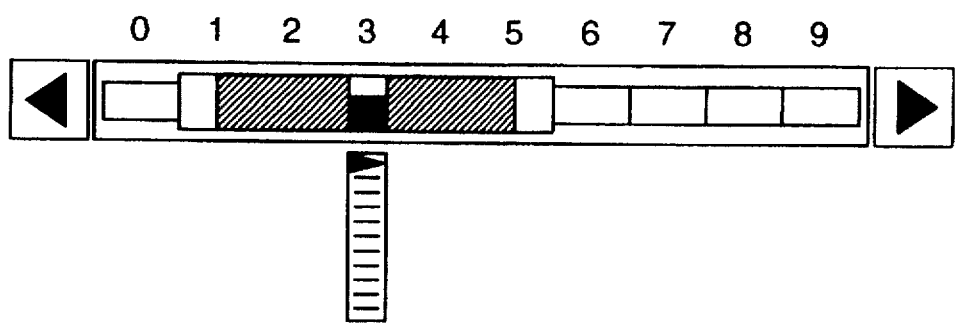
Figure 36B:
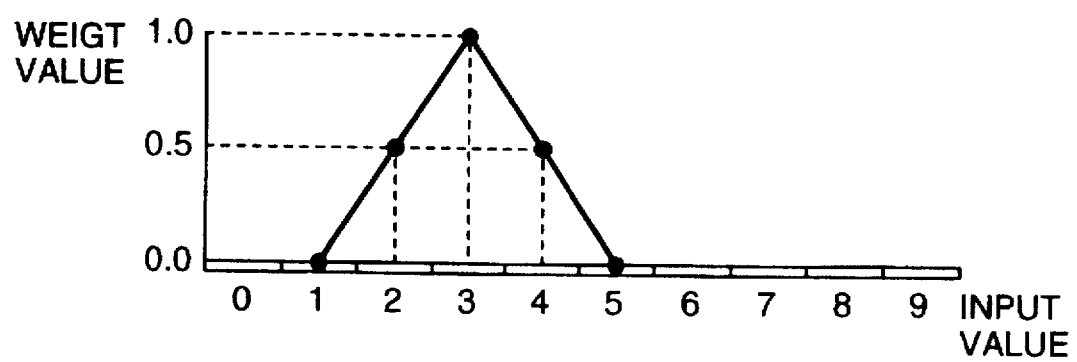

But when an input value N, an upper limit Npmax and a lower limit Npmin which are set by the user are "3", "5" and "1", respectively, and a maximum value of weight value G set by the user is "1.0" as shown in FIG. 36A, a weight value G allotted to the input value N(=3) is "1.0" and weight values G allotted to the upper limit Npmax (=5) and lower limit Npmin (=1), respectively, are "0.0", so that weight values G allotted to an input value (=2) between the input value N and the upper limit Npmax and an input value (=4) between the input value N and the lower limit Npmin, respectively, are "0.5".

Figure 38:
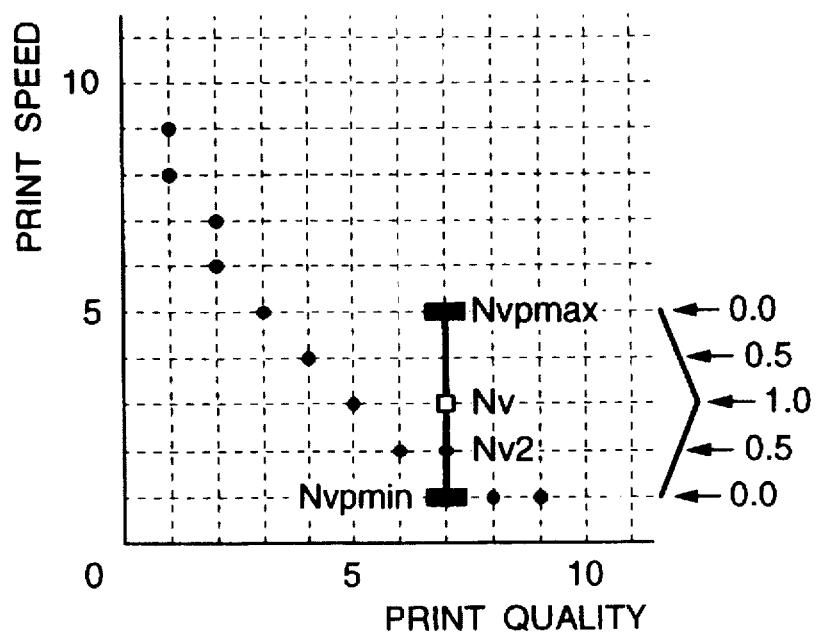

Accordingly, the weight value G allotted to an input value Nv2 of "2" of "print speed" for holding the constraint condition when the "print quality" is "7" is "0.5(>0.3) and is sufficient to hold constraint condition shown in FIG. 38 and resembling the constraint condition shown in FIG. 14, thus ensuring that with the "print quality" set to "7" and the "print speed" set to "2", the application means 205 can acquire a proper input value through one operation effected by the user.

In the present embodiment, the user sets the maximum value of weight value G and a weight value G allotted to a different input value is determined using a straight line but the manner of setting and determining the weight value G is not limited to the above.

Incidentally, in all of the foregoing embodiments, the user sets the input value N but application means 205 other than that requiring an input value may set the input value N. When the information processing apparatus is connected with a different information processing apparatus, the different information apparatus may set the input value N.

When two or more information processing apparatus which have been described in connection with all of the embodiments concerning the first practical form are connected to construct an information processing system, the allowable value determining means 203 of each information processing apparatus can be so constructed as to determine an allowable value a in accordance with allowable value calculating method designating information F delivered out of the application means 205 of another information processing apparatus and in this case, one piece of the allowable value calculating method designating information F can be used in common for these information processing apparatuses.

When two or more information processing apparatuses which have been described in connection with all of the embodiments concerning the first practical form are connected to construct an information processing system, the allowable value adding means 204 of each information processing apparatus can be so constructed as to add an allowable value a determined by the allowable value determining means 203 of another information processing apparatus and in this case, one allowable value a can be used in common for these information processing apparatuses.

When two or more information processing apparatuses which have been described in connection with all of the embodiments concerning the second practical form are connected to construct an information processing system, the allowable value adding means 204 of each information processing apparatus can be so constructed as to add an allowable value a delivered out of the application means 205 of another information processing apparatus and in this case, one allowable value a can be used in common for these information processing apparatuses.

When two or more information processing apparatuses which have been described in connection with all of the embodiments concerning the third practical form are connected to construct an information processing system, the allowable value adding means 204 of each information processing apparatus can be so constructed as to add an allowable value a acquired by the input value acquiring means 202 of another information processing apparatus and in this case, one allowable value a can be used in common for these information processing apparatuses. Since the input value is allowed to have a range when the user adds an allowable value to an input value set by the user in accordance with the kind of a parameter requiring the input value and conditions at that time, the possibility that the input value set by the user is rejected can be reduced. Accordingly, the number of operations by the user can be decreased and the easiness of use by the user can be improved. Especially when input values of two parameters are correlated such that they stand under a predetermined constraint condition, the possibility of holding the constraint condition can be increased and so reliability can be improved.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A conference schedule management support system comprising:

a plurality of information processing apparatuses coupled to each other through communication means, each information processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions in a fuzzy expression from a user who desires to hold a conference, said conference sponsor agent inquires of said schedule management agents of all users who are requested to attend the conference about available times within a range of desirable conference dates, determines whether or not a conference schedule is agreeable by all users who are requested to attend on the basis of available time information from all of the requested attendants, chances at least one aspect of the available time information within a range of the fuzzy expression to coordinate a conference schedule that is agreeable by all users who are requested to attend, presents to said conference sponsor the conference schedule for confirmation thereof, and sends a conference notification to said schedule management agents of the requested attendants.

2. A conference schedule management support system according to claim 1, wherein said conference sponsor further sends inquiries to conference places utilizing the fuzzy expression regarding available times for holding a conference, and said schedule management agents of the requested attendants send information including available time without travel time to the conference place to said conference sponsor agent.

3. A conference schedule management support system according to claim 1, wherein, when a part of a designation of a desirable conference date is omitted, said conference sponsor agent sends an inquiry regarding available times within a range of dates and times for attending the conference.

4. A conference schedule management support system according to claim 1, wherein said conference sponsor agent designates the desirable conference date in a fuzzy expression form, determines a range of dates and times corresponding to the designated expression by consulting past conference information and sends inquiries to said schedule management agents of requested attendants about available times on the basis of the thus obtained range of dates and hours.

5. A conference schedule management support system, comprising:

a plurality of information processing apparatuses coupled to each other through communication means, each information processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions from a user who desires to hold a conference, said conference sponsor agent inquires of said schedule management agents of all users who are requested to attend the conference about available times within a range of desirable conference dates, determines a conference schedule on the basis of available time information from all of the requested attendants, presents to said conference sponsor the conference schedule for confirmation thereof, and sends a conference notification to said schedule management agents of the requested attendants, wherein said conference sponsor agent designates the desirable conference date in a fuzzy expression form, determines a range of dates and times corresponding to the designated expression by consulting past conference information and sends inquiries to said schedule management agents of requested attendants about available times on the basis of the thus obtained range of dates and times, wherein when a time range within which all of the requested attendants are able to attend the conference is not available, said conference sponsor agent extends the range of dates and times corresponding to the fuzzy expression and repetitively sends the inquiries regarding available times until schedules of all requested attendants coincide.

6. A conference schedule management support system, comprising:

a plurality of information processing apparatuses coupled to each other through communication means, each information processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions from a user who desires to hold a conference, said conference sponsor agent inquires of said schedule manager of all users who are requested to attend the conference about available times within a range of desirable conference dates, determines a conference schedule on the basis of the available time information from all of the requested attendants, presents to said conference sponsor the conference schedule for confirmation thereof, and sends a conference notification to said schedule management agents of the requested attendants, wherein when no available time is open but attendance to the conference is possible if the conference place is changed, said schedule management agents answer the inquiries regarding available times within the range of desirable conference dates from said conference sponsor agent by proposing a chance in the conference place to a place where said conference sponsor agent is able to attend, and said conference sponsor agent changes the conference conditions on the basis of said change proposal and again sends the inquiries.

7. A conference schedule management support system according to claim 1, wherein when no available time is open but attendance to the conference is possible if the date is changed, said schedule management agents answer the inquiries regarding available times within the range of the desirable conference dates from said conference sponsor agent by searching for an available time near the desired conference date and proposing a change in the date to a date to said conference sponsor agent and said conference sponsor agent changes the conference conditions on the basis of said change proposal and again sends the inquiries.

8. A conference schedule management support system according to claim 1, wherein when no available time is open but substitute attendance is possible, said schedule management agents of the requested attendants respond to the inquiries regarding available times from said conference sponsor agent by selecting a substitute attendant, sends an inquiry to a schedule management agent of the substitute attendant regarding available times and proposes changing the attendant in the conference conditions to the substitute attendant designated by the requested attendant to said conference sponsor agent.

9. A conference schedule management support system, comprising:

a plurality of information processing apparatuses coupled to each other through communication means, each information processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions from a user who desires to hold a conference, said conference sponsor agent inquires of said schedule management agents of all users who are requested to attend the conference about available times within a range of desirable conference dates, determines a conference schedule on the basis of the available time information from all of the requested attendants, presents to said conference sponsor the conference schedule for confirmation thereof, and sends a conference notification to said schedule management agents of the requested attendants, wherein when there are a plurality of candidate time ranges for scheduling the conference, said conference sponsor agent selects, as a first candidate, a weekday and a conference giving time range which were selected most frequently for past conferences of the same series thereof known from past schedule information and sends notice of the first candidate to said conference sponsor.

10. A conference schedule management support system, comprising:

a plurality of information processing apparatuses coupled to each other through communication means, each information processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions from a user who desires to hold a conference, said conference sponsor agent inquires of said schedule management agents of all users who are requested to attend the conference about available times within a range of desirable conference dates, determines a conference schedule on the basis of the available time information from all of the requested attendants, presents to said conference sponsor the conference schedule for confirmation thereof, and sends a conference notification to said schedule management agents of the requested attendants, wherein when there are a plurality of candidate time ranges for scheduling the conference, candidates of time ranges are arranged in the order of frequency according to past conferences of the same series known from past schedule information, and the time range candidates are sent to said conference sponsor.

11. A conference schedule management support system, comprising:

a plurality of information processing apparatuses coupled to each other through communication means, each information processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions from a user who desires to hold a conference, said conference sponsor agent inquires of said schedule management agents of all users who are requested to attend the conference about available times within a range of desirable conference dates, determines a conference schedule on the basis of the available time information from all of the requested attendants, presents to said conference sponsor the conference schedule for confirmation thereof, and sends a conference notification to said schedule management agents of the requested attendants, wherein when there are a plurality of candidate time ranges for scheduling the conference, said conference sponsor agent determines an average of intervals at which past conferences belonging to the same series were held according to past schedule information, selects as a first candidate a day which is closest to the interval of days from the conference held most recently by the average interval of days between conferences, and sends notice of the first candidate to said conference sponsor.

12. A conference schedule management support system, comprising:

a plurality of information processing apparatuses coupled to each other through communication means, each information processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions from a user who desires to hold a conference, said conference sponsor agent inquires of said schedule management agents of all users who are requested to attend the conference about available times within a range of desirable conference dates, determines a conference schedule on the basis of the available time information from all of the requested attendants, presents to said conference sponsor the conference schedule for confirmation thereof, and sends a conference notification to said schedule management agents of the requested attendants, wherein said conference sponsor agent adds adds increments of "1" to a consecutive number of conferences held most recently in each series of conferences to series names of past conferences known from past schedule information and displays a resulting series names in a list.

13. A conference schedule management support system, comprising:

a plurality of information processing apparatuses coupled to each other through communication means, each information Processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions from a user who desires to hold a conference, said conference sponsor agent inquires of said schedule management agents of all users who are requested to attend the conference about available times within a range of desirable conference dates, determines a conference schedule on the basis of the available time information from all of the requested attendants, presents to said conference sponsor the conference schedule for confirmation thereof, and sends a conference notification to said schedule management agents of the requested attendants, wherein when designation of conference place is omitted, said conference sponsor agent determines the number of first candidates for requested attendants, searches and reserves a conference room which is unoccupied and which can be utilized by that number of requested attendants, and sets said conference room as the conference place.

14. A conference schedule management support system, comprising:

a plurality of information processing apparatuses coupled to each other through communication means, each information processing apparatus having a function of interacting with a user, a schedule management agent which holds schedule information for each user and a conference sponsor agent which performs schedule adjustment for requested attendants in accordance with desirable conditions for scheduling a conference designated by a user, wherein, when given desirable conference scheduling conditions from a user who desires to hold a conference, said conference sponsor agent inquires of said schedule management agents of all users who are requested to attend the conference about available times within a range of desirable conference dates, determines a conference schedule on the basis of the available time information from all of the requested attendants, presents to said conference sponsor the conference schedule for confirmation thereof, and sends a conference notification to said schedule management agents of the requested attendants, wherein when designation of conference place is omitted, said conference sponsor agent searches for conference rooms in the order of frequency at which past conferences of the same series were held thereat until a usable conference room is found and reserved, and confirms the reserved conference room as the conference place.

15. A conference schedule management support system in which a plurality of information processing apparatuses each having a function of interacting with a users are coupled to each other through communication means, a schedule management agent holds schedule information for each user and a conference sponsor agent performs schedule adjustment for requested attendants in accordance with desirable conditions for holding a conference designated by a user, said system comprising:

means for holding schedule information for each user;
means for setting schedule information;
means for reading the schedule information;
information holding means for holding a user's information in a fuzzy expression used to perform conference and schedule management;
means for retrieving information from said information holding means;
conference condition setting means for inputting conditions in the fuzzy expression for scheduling a conference on the basis of a designation by a user;
schedule inquiring means for sending an inquiry to said information processing apparatus of all requested attendants of the conference set by said conference condition setting means regarding available times within a range of desirable conference dates and times set by said conference condition setting means;
schedule searching means, in response to the inquiry, for reading schedule information available within a corresponding range of dates and hours;
schedule returning means for sending available time information;
conference hour determining means for selecting an optimum time range within which all requested attendants are able to attend the conference within the range of conditions expressed in fuzzy form based on the available time information sent from the requested attendants and determining the selected optimum time range;
conference contents notifying means for sending notice of the determined conference contents to a user who has input the conference conditions; and
conference giving notifying means for transmitting a conference giving notice message to said information processing apparatus of the requested attendants on the basis of information of the conference contents determined by said conference hour determining means.

16. An information processing apparatus, comprising:
processing means for execution of processings;
input value acquiring means for acquiring an input value of a parameter necessary for said processing means to execute a processing;
an allowable value determining means for determining an allowable value to be added to the input value acquired by said input value acquiring means in accordance with information expressed in fuzzy form supplied from said processing means; and
allowable value adding means for determining a different input value including the acquired input value or another different input value exclusive of the acquired input value by adding the allowable value determined by said allowable value determining means to the input value acquired by said input value acquiring means.

17. An information processing apparatus according to claim 16, wherein said allowable value determining means determines the allowable value to be added to the input value acquired by said input value acquiring means by selecting any one of a plurality of allowable values, and said processing means responds to information concerning the parameter to supply information for specifying the allowable value to be selected by said allowable value determining means.

18. An information processing apparatus according to claim 16, wherein said input value acquiring means acquires a designation regarding whether a user acknowledges the input value determined by said allowable value adding means, said apparatus further comprises allowable value learning means for storing designated contents acquired by said input value acquiring means in accordance with the kinds of parameters, said allowable value determining means modifies the determined allowable value on the basis of the storage contents of said allowable value learning means.

19. An information processing system having two or more information processing apparatus as recited in claim 18 and connected to each other, wherein allowable value determining means of each of said information processing apparatus determines an allowable value in accordance with information delivered out of a different information processing apparatus.

20. An information processing apparatus, comprising:
processing means for executing processings;
input value acquiring means for acquiring an input value of a parameter expressed in fuzzy form necessary for said processing means to execute a processing; and
allowable value adding means for determining a different input value including the acquired input value or another different input value excluding the acquired input value by adding an allowable value corresponding to information concerning the parameter supplied from said processing means to the input value acquired by said input value acquiring means.

21. An information processing apparatus, comprising:
processing means for executing processings;
input value acquiring means for acquiring an input value of a parameter necessary for said processing means to execute a processing; and
allowable value adding means for determining a different input value including the acquired input value or another different input value excluding the acquired input value by adding an allowable value corresponding to information concerning the parameter supplied from said processing means to the input value acquired by said input value acquiring means, wherein said input value acquiring means acquires a designation regarding whether a user acknowledges the input value determined by said allowable value adding means, and said apparatus further comprises allowable value learning means for storing designated contents acquired by said input value acquiring means in accordance with the kinds of parameters and allowable value modifying means for modifying the allowable value to be added by said allowable value adding means on the basis of the storage contents of said allowable value learning means.

22. An information processing apparatus, comprising:

processing means for executing processings;

input value acquiring means for acquiring an input value of a parameter, expressed in fuzzy form, necessary for said processing means to execute a processing and an allowable value to be added to the input value; and allowable value adding means for determining a different input value from the acquired input value by adding the allowable value acquired by said input value acquiring means to the input value acquired by said input value acquiring means, wherein said processing means determines whether the input value acquired by said input value acquiring means and the input value determined by said allowable value adding means are input values suitable for executing the processing.

23. An information processing apparatus according to claim 22, wherein said processing means handles the input value acquired by said input value acquiring means in preference to the input value determined by said allowable value adding means.

24. An information processing apparatus, comprising:

processing means for executing processings;

input value acquiring means for acquiring an input value of a parameter necessary for said processing means to execute a processing and an allowable value to be added to the input value; and allowable value adding means for determining a different input value from the acquired input value by adding the allowable value acquired by said input value acquiring means to the input value acquired by said input value acquiring means, wherein said processing means decides whether the input value acquired by said input value acquiring means and the input value determined by said allowable value adding means are input values suitable for executing the processing, wherein said input value acquiring means acquires a weight value representing a value of a weighting set by a user or said processing means, and said processing means allots weight values acquired by said input value acquiring means to the input value acquired by said input value acquiring means and the input value determined by said allowable value adding means, respectively, to distinctively handle the two input values.

25. An information processing apparatus according to claim 24, wherein said input value acquiring means acquires an allowable value set by the user.

26. An information processing apparatus according to claim 25, wherein said input value acquiring means acquires an input value set by the user.

27. An information processing apparatus according to claim 25, further comprising different processing means for executing a different processing from that executed by said processing means, wherein said input value acquiring means acquires an input value set by said different processing means.

28. An information processing apparatus according to claim 25, wherein said information processing apparatus is connected to different information processing apparatus, and said input value acquiring means acquires an input value delivered out of said different information processing apparatus.

29. An information processing system having two or more information processing apparatus as recited in claim 28 and connected to each other, wherein allowable value adding means of each of said information processing apparatus adds an allowable value delivered out of a different information processing apparatus.

* * * * *